United States Patent
Zhang et al.

(10) Patent No.: US 11,979,829 B2
(45) Date of Patent: May 7, 2024

(54) UE POWER SAVING FOR SRS ANTENNA SWITCHING

(71) Applicant: APPLE INC., Cupertino, CA (US)

(72) Inventors: Yushu Zhang, Beijing (CN); Chunhai Yao, Beijing (CN); Chunxuan Ye, San Diego, CA (US); Dawei Zhang, Cupertino, CA (US); Haitong Sun, Cupertino, CA (US); Hong He, Cupertino, CA (US); Oghenekome Oteri, San Diego, CA (US); Wei Zeng, Cupertino, CA (US); Weidong Yang, San Diego, CA (US)

(73) Assignee: APPLE INC., Cupertino, CA (US)

( * ) Notice: Subject to any disclaimer, the term of this patent is extended or adjusted under 35 U.S.C. 154(b) by 331 days.

(21) Appl. No.: 17/593,564

(22) PCT Filed: May 15, 2020

(86) PCT No.: PCT/CN2020/090536
§ 371 (c)(1),
(2) Date: Sep. 21, 2021

(87) PCT Pub. No.: WO2021/227021
PCT Pub. Date: Nov. 18, 2021

(65) Prior Publication Data
US 2022/0174592 A1    Jun. 2, 2022

(51) Int. Cl.
*H04W 52/02* (2009.01)
*H04L 5/00* (2006.01)

(52) U.S. Cl.
CPC ....... *H04W 52/0212* (2013.01); *H04L 5/0048* (2013.01)

(58) Field of Classification Search
CPC ............. H04W 52/02; H04W 56/0015; H04W 52/0274; H04W 52/0261; H04W 52/0277;
(Continued)

(56) References Cited

U.S. PATENT DOCUMENTS

2011/0096815 A1*  4/2011  Shin et al. ................. 375/219
2018/0007707 A1*  1/2018  Rico Alvarino et al. .......... H04W 72/1263

(Continued)

FOREIGN PATENT DOCUMENTS

KR    1020190086332       7/2019
WO     2018210425 A1     11/2018
(Continued)

OTHER PUBLICATIONS

Frenger et al. (CN 102771165 A) >>> A Control Method And Device Of Multiple-antenna Base Station Energy Consumption (see title). (Year: 2012).*

(Continued)

*Primary Examiner* — Meless N Zewdu
(74) *Attorney, Agent, or Firm* — Dorsey & Whitney LLP

(57) ABSTRACT

A user equipment (UE) may perform sounding reference signal (SRS) switching by transmitting one or more SRS using a plurality of SRS resources of an SRS resource set configured for SRS switching according to a first combination of downlink (DL) and uplink (UL) antenna ports. For UE power saving, the UE may turn off one or more of the DL and UL antenna ports. The UE may then reconfigure the plurality of SRS resources of the SRS resource set for SRS switching according to a second combination of the DL and UL antenna ports. In response to a power saving message from a UE, a base station may generate SRS configuration information to configure an SRS resource set for SRS antenna switching based on a combination of active DL and UL antenna ports at the UE, and send the SRS configuration information to the UE.

18 Claims, 14 Drawing Sheets

(58) Field of Classification Search
CPC ......... H04W 52/0245; H04W 56/0095; H04W 52/60; H04W 88/00; H04W 88/02; H04W 88/08; H04W 88/85; H04W 92/10; H04W 88/18; H04W 88/005; H04W 52/00; H04W 52/028; H04W 52/0229; H04W 52/0235; H04W 52/0206; H04L 25/0202; H04L 25/0224; H04L 25/0226; H04L 25/0228; H04L 25/0232; H04L 5/0048; H04L 5/0051; H04L 5/00; H04J 11/0069; H04B 7/06966; H04B 7/2128; H04B 7/2126; H04B 17/328; H04B 7/0604; H04B 7/0693; H04B 7/0822; H04B 7/0877; H04B 7/06; H04B 7/08; Y02D 30/70

See application file for complete search history.

(56) References Cited

U.S. PATENT DOCUMENTS

| | | | |
|---|---|---|---|
| 2019/0053287 A1* | 2/2019 | Lin et al. | H04W 74/0833 |
| 2019/0158244 A1* | 5/2019 | Shin et al. | H04L 5/0048 |
| 2019/0253214 A1* | 8/2019 | Liu et al. | H04L 5/0048 |
| 2019/0349066 A1* | 11/2019 | Yang et al. | H04B 7/0697 |
| 2019/0356445 A1* | 11/2019 | Manolakos | H04L 5/0051 |
| 2020/0028638 A1* | 1/2020 | Liu et al. | H04L 5/005 |
| 2020/0052853 A1 | 2/2020 | Qin et al. | |
| 2020/0099490 A1* | 3/2020 | Sridharan et al. | H04L 5/0048 |
| 2020/0112349 A1* | 4/2020 | Yang et al. | H04B 7/0417 |
| 2020/0153579 A1* | 5/2020 | Charbit et al. | H04L 5/0048 |
| 2020/0280465 A1* | 9/2020 | Kim et al. | H04L 25/0226 |

FOREIGN PATENT DOCUMENTS

| | | |
|---|---|---|
| WO | 2019103560 A1 | 5/2019 |
| WO | 2020038343 A1 | 2/2020 |
| WO | 2020075090 A1 | 4/2020 |
| WO | 2020077536 A1 | 4/2020 |

OTHER PUBLICATIONS

Huawei, Hisilicon, "UE dynamic adaptation to the maximum number of MIMO layer", R1-1910078, 3GPP TSG RAN WG1 Meeting #98bis, Chongqing, China, Agenda Item 7.2.9.3, Oct. 14-20, 2019, 5 pages.

PCT/CN2020/090536, International Search Report and Written Opinion, dated Feb. 10, 2021, 9 pages.

OPPO, CMCC, ZTE, Nokia, Nokia Shanghai Bell, APT, AT&T, Xiaomi, Spreadtrum Communication, "Enable gNB to configure downgrading configuration of SRS for antenna switching", R1-1910125, 3GPP TSG RAN WG1 Meeting #98bis Chongqing, China, Agenda Item 7.2.14, Oct. 14-20, 2019, 6 pages.

Vivo, "Discussion on UE adaptation to maximum number of MIMO layers 7.2.9.3", R1-1910235, 3GPP TSG RAN WG1 #98bis Chongqing, China, Agenda Item 7.2.9.3, Oct. 14-20, 2019, 5 pages.

* cited by examiner

UE POWER SAVING FOR SRS ANTENNA SWITCHING

TECHNICAL FIELD

This application relates generally to wireless communication systems, and more specifically to sounding reference signal (SRS) antenna switching.

BACKGROUND

Wireless mobile communication technology uses various standards and protocols to transmit data between a base station and a wireless mobile device. Wireless communication system standards and protocols can include the 3rd Generation Partnership Project (3G PP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Bands in the millimeter wave (mmWave) range of FR2 may have smaller coverage but potentially higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

A sounding reference signal (SRS) is a reference signal used to measure an uplink channel. A gNB or other network device may measure an uplink channel based on an SRS sent by a UE to determine channel conditions or quality of the uplink channel and schedule uplink resources. In some systems with channel reciprocity, the gNB may estimate channel state information (CSI) of a downlink channel by using the CSI of the uplink channel obtained by measuring the uplink channel to schedule downlink resources. However, if the number of uplink antennas configured for the UE is less than the number of downlink antennas, the UE may need to switch a plurality of antennas to send a plurality of SRSs so that the gNB obtains CSI of a plurality of downlink channels.

In Release 15 (Rel-15) NR or 5G networks, a UE may support antenna switching (e.g., also referred to as antenna port switching or port switching) to transmit SRS for downlink channel estimation. The UE may have a different number of transmit (Tx) antenna ports (N_tx) and receive (Rx) antenna ports (N_rx), where N_tx may typically be lower than N_rx. To measure downlink CSI based on uplink (UL) channel, the gNB may trigger multiple SRS resources to construct a downlink (DL) channel. Certain systems support several types of antenna switching as "xTyR," where "T" represents Tx antenna ports or Tx chains, "R" represents Rx antenna ports or Rx chains, x={1, 2, 4} (the number of Tx antenna ports/chains), and y={2, 4} (the number of Rx antenna ports/chains). For example, for a 2T4R UE with 2 Tx chains and 4 Rx chains, the UE may transmit an SRS twice on each of the 2 Tx chains (e.g., using antenna switching) to sound the channels for each of the 4 Rx chains.

Similarly, for a 1T4R UE with 1 Tx chain and 4 Rx chains, the UE may transmit SRS four times on the single Tx chain (e.g., using antenna switching) to sound the channels for each of the 4 Rx chains. Skilled persons will recognize from the disclosure herein that other values of x and y may be used. For example, in Release 17 (Rel-17) NR or 5G networks, y may be increased to include 8.

Figure 1:
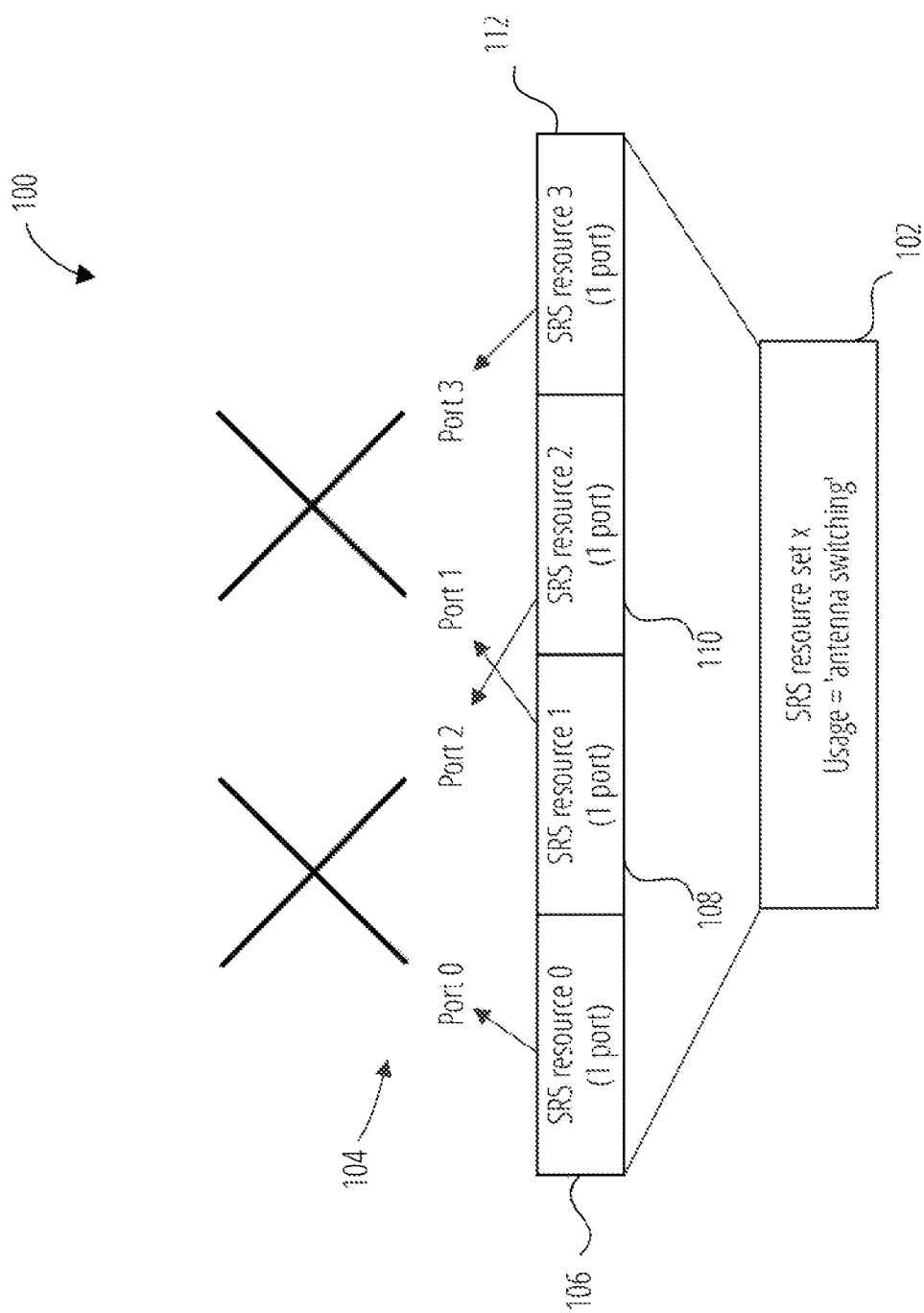
FIG. 1 illustrates an example of SRS antenna switching in accordance with one embodiment.

FIG. 1 illustrates an example of SRS antenna switching 100 for 1T4R. In this example, an SRS resource set 102 (referred to as SRS resource set x) is used to transmit (e.g., broadcast) SRS using a plurality of ports 104 (shown as port 0, port 1, port 2, and port 3). An SRS resource set may be configured for different types of usages including, respectively codebook based transmission, non-codebook based transmission, a transmission involving antenna switching and/or a transmission involving beam management. One SRS resource set may include one or more SRS resources. The SRS resource set 102 shown in FIG. 1 is configured for antenna switching usage (Usage='antenna switching' or usage at least includes antenna switching) and includes a first SRS resource 106 (referred to as SRS resource 0) for 1 port, a second SRS resource 108 (referred to as SRS resource 1) for 1 port, a third SRS resource 110 (referred to as SRS resource 2) for 1 port, and a fourth SRS resource 112 (referred to as SRS resource 3) for 1 port.

For the 1T4R example shown in FIG. 1, the UE uses antenna switching to transmit SRS four times on a single Tx chain to sound the channels for each of the 4 Rx chains. The SRS resource 0 is used to transmit SRS on port 0, the SRS resource 1 is used to transmit the SRS on port 1, the SRS resource 2 is used to transmit the SRS on port 2, and the SRS resource 3 is used to transmit the SRS on port 3. After receiving the four SRS resources, the gNB can construct the DL channel.

In Release 16 (Rel-16) NR or 5G networks, with regard to UE power saving, a UE may turn off some UL/DL antenna ports and report such behavior to gNB. In certain embodiments, for example, the UE may signal a preference to the gNB for using a number of UL and/or DL multiple-input-multiple-output (MIMO) layers. For example, the UE may send a message to the gNB that includes a maximum MIMO layer preference information element, such as:

```
MaxMIMO-LayerPreference-r16 ::=    SEQUENCE {
    reducedMaxMIMO-LayersFR1-r16      SEQUENCE {
        reducedMIMO-LayersFR1-DL-r16     INTEGER (1...8),
        reducedMIMO-LayersFR1-UL-r16     INTEGER (1..4)
    } OPTIONAL,
    reducedMaxMIMO-LayersFR2-r16      SEQUENCE {
        reducedMIMO-LayersFR2-DL-r16     INTEGER (1..8),
        reducedMIMO-LayersFR2-UL-r16     INTEGER (1..4)
    } OPTIONAL
}
```

Figure 2:
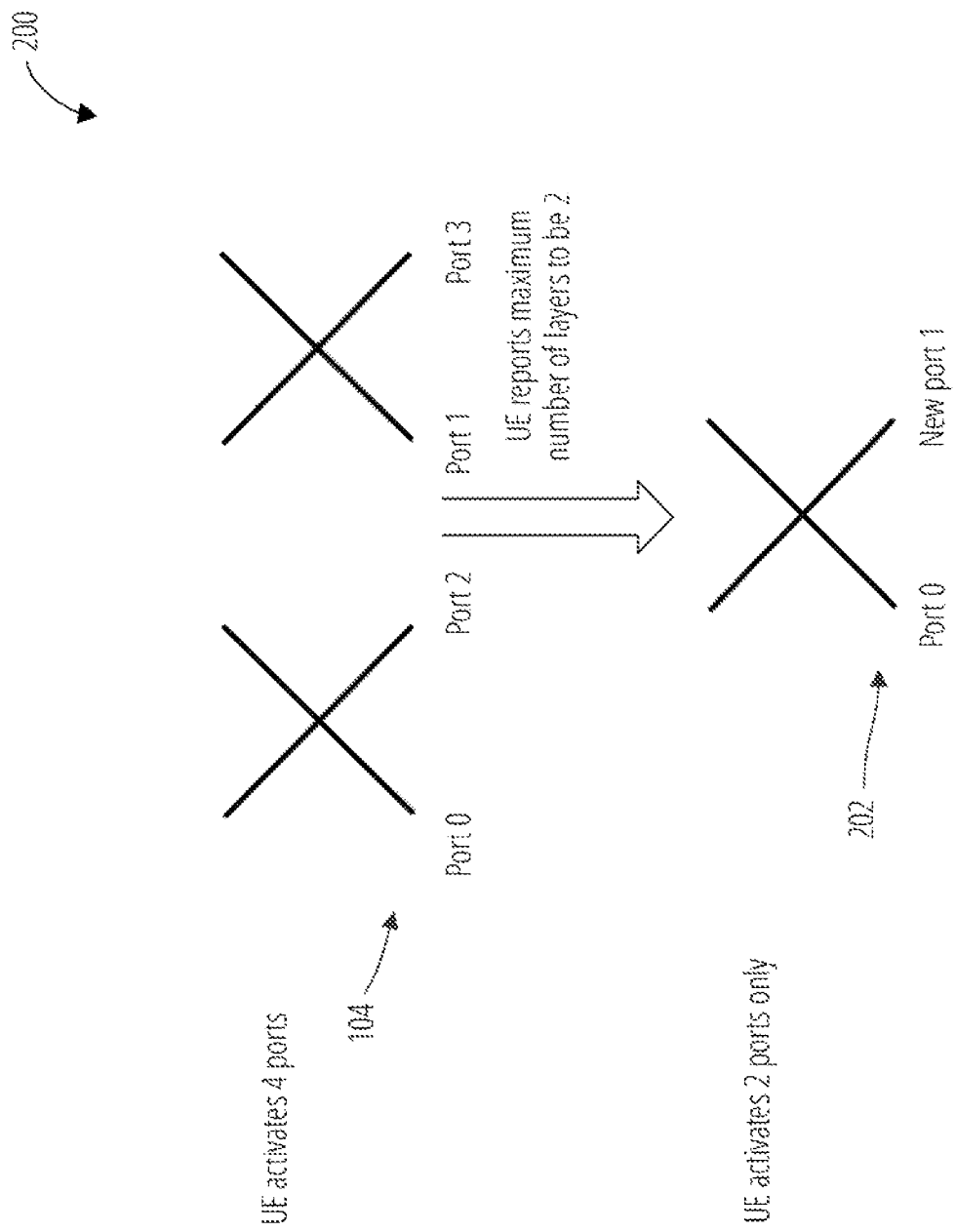
FIG. 2 illustrates an example UE power saving mode in accordance with one embodiment.

FIG. 2 illustrates an example UE power saving mode 200 wherein a LE turns off one or more antenna ports according to certain embodiments. In this example, the UE activates four ports 104 (referred to as port 0, port 1, port 2, and port 3). However, the UE may determine that current conditions do not use or need four antenna ports. Thus, the UE reports to the gNB that the maximum number of MIMO layers is 2 (or indicates a preference to the gNB for a maximum of 2 MIMO layers). In response, the gNB may signal to the UE to only activate 2 antenna ports 202 (shown as port 0 and new port 1). By using fewer antenna ports, the UE saves power.

To save power, the UE may turn off any number of antenna ports. However, after the UE turns off one or more antennas, the UE may need to determine how to transmit the SRS for antenna switching. In certain embodiments, SRS antenna switching is reconfigured when the UE turns off one or more DL antennas only. In other embodiments, SRS antenna switching is reconfigured when the UE turns off one or more UL antennas only. In yet other embodiments, SRS antenna switching is reconfigured when the UE turns off at least one DL antenna and at least one UL antenna. Turning off DL antennas, UL antennas, or both DL and UL antennas may result in y not being an integer multiple of x in an SRS resource set for xTyR (e.g., 4T6R). Thus, certain embodiments reconfigure SRS antenna switching when y is not an integer multiple of x.

In certain embodiments, when antenna ports are turned off, the UE may reconfigure SRS resources of an SRS resource set for SRS switching without any further input from the gNB. In other embodiments, when antenna ports are turned off, the gNB provides SRS configuration information to the UE for reconfiguring SRS resources of an SRS resource set for SRS switching. An SRS configuration (sometimes referred to as an SRS resource configuration or an SRS resource set configuration) may be indicated in a radio resource control (RRC) message (e.g., an RRC configuration message, and RRC reconfiguration message). An SRS configuration may indicate one or more resources that are included in an SRS resource set. The resources may include time resources, frequency resources, spatial resources, and/or the like (e.g., a slot, a symbol, a resource block, a periodicity for the time resources, a beam, and/or a spatial reference). The SRS configuration may also include mappings of SRS resources to antenna ports.

Turning Off One or More DL Ports.

In one embodiment, if a UE turns off one or more DL ports such that xTyR changes to xTy'R (where y'<y), the UE does not transmit the SRS resources corresponding to y-y' ports for an SRS resource set antenna switching xTyR.

Figure 3:
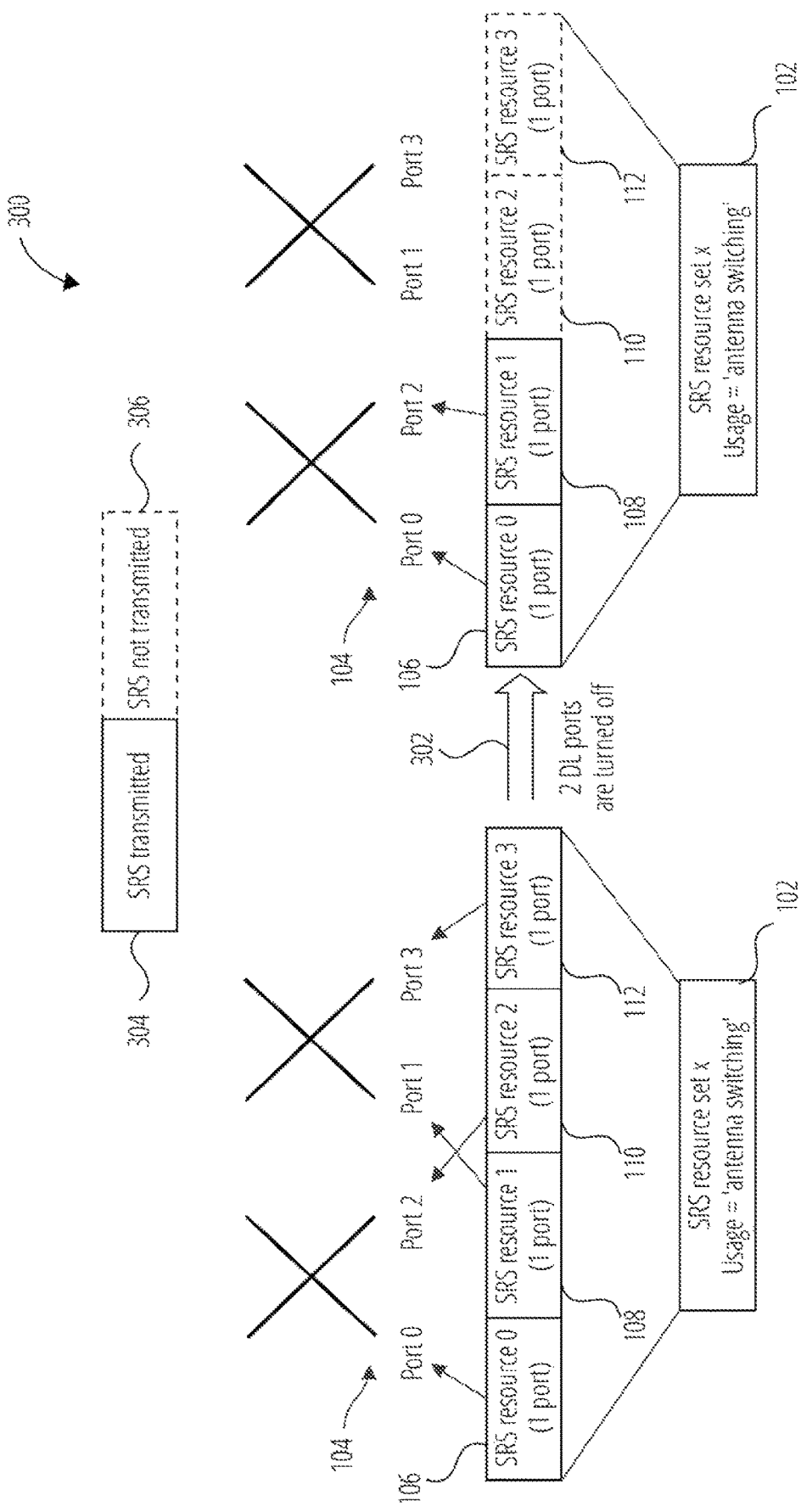
FIG. 3 illustrates an example of SRS antenna switching before and after a UE turns off downlink ports in accordance with one embodiment.

For example, FIG. 3 illustrates an example of SRS antenna switching 300 for the SRS resource set 102 shown in FIG. 1 for 1T4R before and after a UE turns off 2 DL ports according to one embodiment. As discussed with respect to FIG. 1, the SRS resource set 102 shown in FIG. 3 is configured for antenna switching usage (Usage='antenna switching' or usage at least includes antenna switching) and includes the first SRS resource 106 (referred to as SRS resource 0) for 1 port, the second SRS resource 108 (referred to as SRS resource 1) for 1 port, the third SRS resource 110 (referred to as SRS resource 2) for 1 port, and the fourth SRS resource 112 (referred to as SRS resource 3) for 1 port.

Before the UE turns off the 2 DL ports, as represented to the left of the arrow 302, the UE uses antenna switching to transmit SRS four times on a single Tx chain to sound the channels for each of the 4 Rx chains, wherein the SRS resource 0 is used to transmit SRS on port 0, the SRS resource 1 is used to transmit the SRS on port 1, the SRS resource 2 is used to transmit the SRS on port 2, and the SRS resource 3 is used to transmit the SRS on port 3.

After the UE turns off the 2 DL ports (e.g., port 1 and port 3), as represented to the right of the arrow 302, the LIE only transmits SRS on y-y' ports (4-2=2 ports). Thus, as shown in FIG. 3, the UE may transmit SRS using the first SRS resource 106 (SRS resource 0) and the second SRS resource 108 (SRS resource 1) but not using the third SRS resource 110 (SRS resource 2) and the fourth SRS resource 112 (SRS resource 3), when the SRS resource set 102 is triggered. For illustrative purposes, solid lines used for SRS resources indicates SRS transmitted (as shown by legend 304) and dashed lines used for SRS resources indicates SRS not transmitted (as shown by legend 306). If the SRS not transmitted (i.e., the SRS configured to be transmitted by SRS resource 2 and SRS resource 3 for 1T4R) collides with other uplink signal/channel(s), the other signals/channels can be transmitted.

In another embodiment, if a UE turns off one or more DL ports such that xTyR changes to xTy'R (where y'<y), the UE transmits all the SRS resources for an SRS resource set antenna switching xTyR. The SRS resources (e.g., corresponding to y-y' Rx chains) may be re-mapped to other active DL ports to achieve repetition gain.

Figure 4:
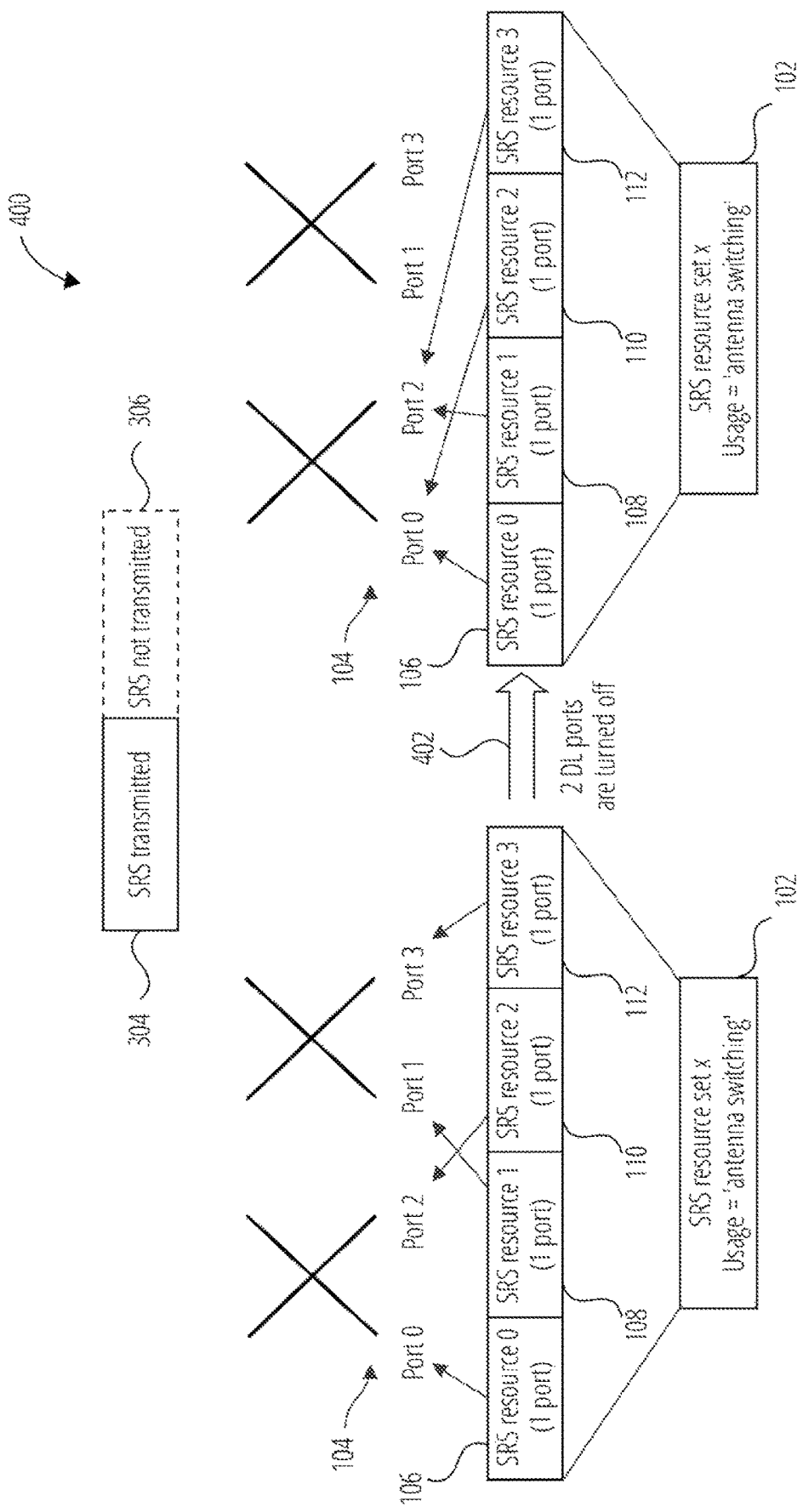
FIG. 4 illustrates an example of SRS antenna switching before and after a UE turns off downlink ports in accordance with another embodiment.

For example, FIG. 4 illustrates an example of SRS antenna switching 400 for the SRS resource set 102 shown in FIG. 1 for 1T4R before and after a UE turns off 2 DL ports according to one embodiment. As discussed with respect to FIG. 1, the SRS resource set 102 shown in FIG. 4 is configured for antenna switching usage (Usage='antenna switching' or usage at least includes antenna switching) and includes the first SRS resource 106 (referred to as SRS resource 0) for 1 port, the second SRS resource 108 (referred to as SRS resource 1) for 1 port, the third SRS resource 110 (referred to as SRS resource 2) for 1 port, and the fourth SRS resource 112 (referred to as SRS resource 3) for 1 port.

Before the UE turns off the 2 DL ports, as represented to the left of the arrow 402, the UE uses antenna switching to transmit SRS four times on a single Tx chain to sound the channels for each of the 4 Rx chains, wherein the SRS resource 0 is used to transmit SRS on port 0, the SRS resource 1 is used to transmit the SRS on port 1, the SRS resource 2 is used to transmit the SRS on port 2, and the SRS resource 3 is used to transmit the SRS on port 3.

After the UE turns off the 2 DL ports (e.g., port 1 and port 3), as represented to the right of the arrow 402, SRS resource 1 is re-mapped from port 1 to port 2, SRS resource 2 is re-mapped from port 2 to port 0, and SRS resource 3 is re-mapped from port 3 to port 2. Skilled persons will recognize from the disclosure herein that other re-mapping combinations are also possible. The UE uses antenna switching to transmit SRS four times on a single Tx chain to sound the channels for each of the 4 Rx chains, wherein the SRS resource 0 is used to transmit SRS on port 0, the SRS resource 1 is used to transmit the SRS on port 2, the SRS resource 2 is used to transmit the SRS on port 0, and the SRS resource 3 is used to transmit the SRS on port 3.

If a repeated SRS resource collides with another uplink signal, the other uplink signal can be transmitted. For example, in one embodiment, the UE drops the entire SRS resource set 102 when a repeated SRS resource collides with another uplink signal. In another embodiment, however, the only drops the repeated SRS resource. For example, referring to the right side of the arrow 402 in FIG. 4, if an SRS is transmitted on port 0 using SRS resource 0 and the repeated SRS resource 3 would collide with another uplink signal, the UE may determine to not transmit the SRS through port 0 using the SRS resource 3.

In one embodiment, if a UE turns off one or more DL ports such that xTyR changes to xTy'R (where y'<y), rather than transmitting the SRS resource set configured with xTyR, the UE only transmits the SRS resource set when it is configured with xTy'R. In other words, after turning off one or more DL ports, the UE waits until it is configured by the gNB with a new SRS configuration.

Figure 5:
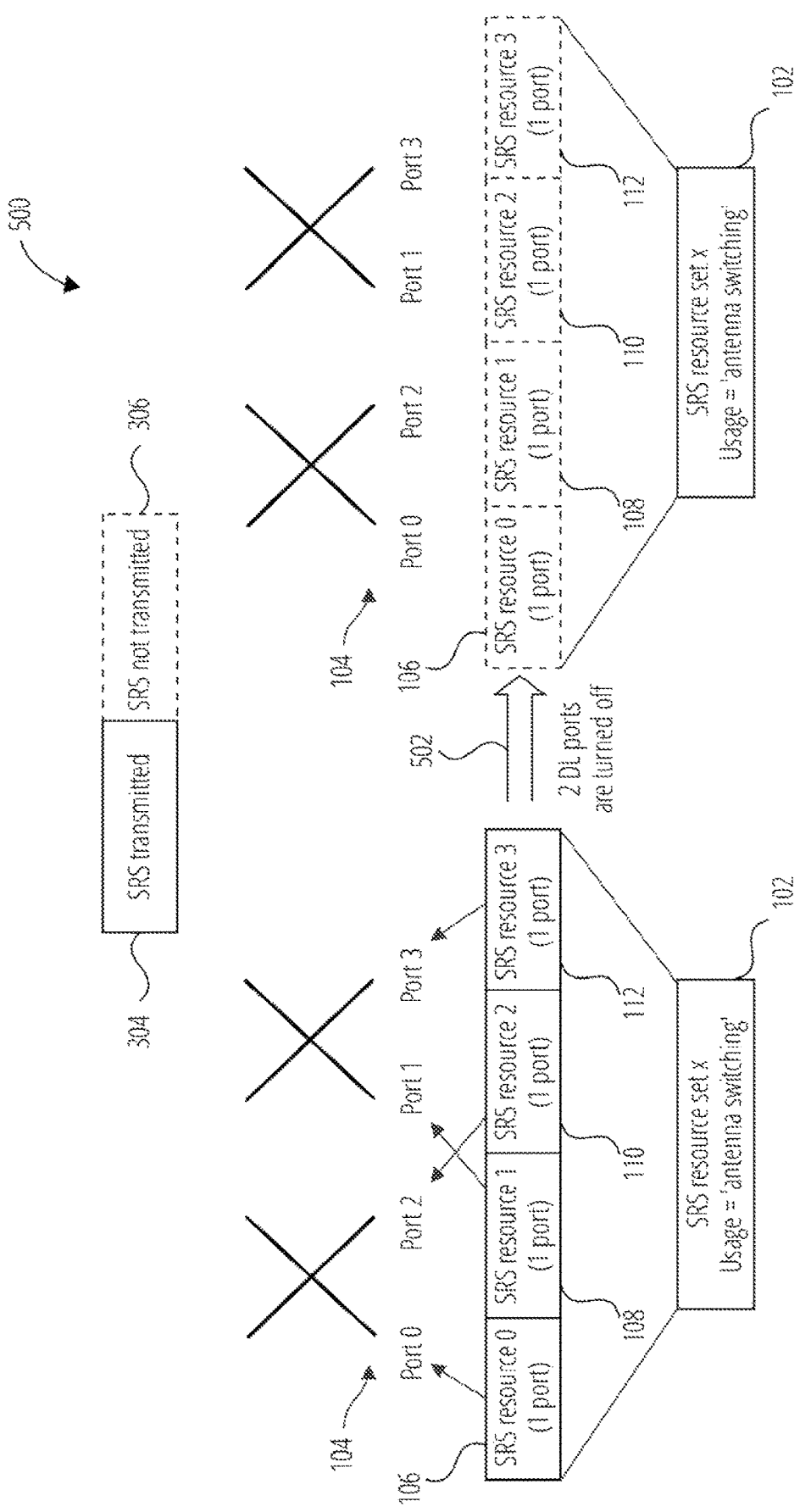
FIG. 5 illustrates an example of SRS antenna switching before and after a UE turns off downlink ports in accordance with another embodiment.

For example, FIG. 5 illustrates an example of SRS antenna switching 500 for the SRS resource set 102 shown in FIG. 1 for 1T4R before and after a UE turns off 2 DL ports according to one embodiment. As discussed with respect to FIG. 1, the SRS resource set 102 shown in FIG. 5 is configured for antenna switching usage (Usage='antenna switching' or usage at least includes antenna switching) and includes the first SRS resource 106 (referred to as SRS resource 0) for 1 port, the second SRS resource 108 (referred to as SRS resource 1) for 1 port, the third SRS resource 110 (referred to as SRS resource 2) for 1 port, and the fourth SRS resource 112 (referred to as SRS resource 3) for 1 port.

Before the UE turns off the 2 DL ports, as represented to the left of the arrow 502, the UE uses antenna switching to transmit SRS four times on a single Tx chain to sound the channels for each of the 4 Rx chains, wherein the SRS resource 0 is used to transmit SRS on port 0, the SRS resource 1 is used to transmit the SRS on port 1, the SRS resource 2 is used to transmit the SRS on port 2, and the SRS resource 3 is used to transmit the SRS on port 3.

After the UE turns off the 2 DL ports, as represented to the right of the arrow 502, the UE does not transmit SRS on any of the ports 104 using any of SRS resource 0, SRS resource 1, SRS resource 2, or SRS resource 3 of the SRS resource set 102. In certain embodiments, the gNB may reconfigure the SRS resource set 102 with a new SRS configuration based on xTy'R. The UE may then transmit SRS using the SRS resource set 102 configured based on xTy'R.

Turning off one or more UL ports.

In one embodiment, if a UE turns off one or more UL ports such that xTyR changes to x'TyR (where x'<x), the UE does not transmit the SRS resource set configured with xTyR regardless of whether it is triggered or not. In certain such embodiments, the UE only transmits the SRS resource set for antenna switching when it is configured with x'TyR.

Figure 6:
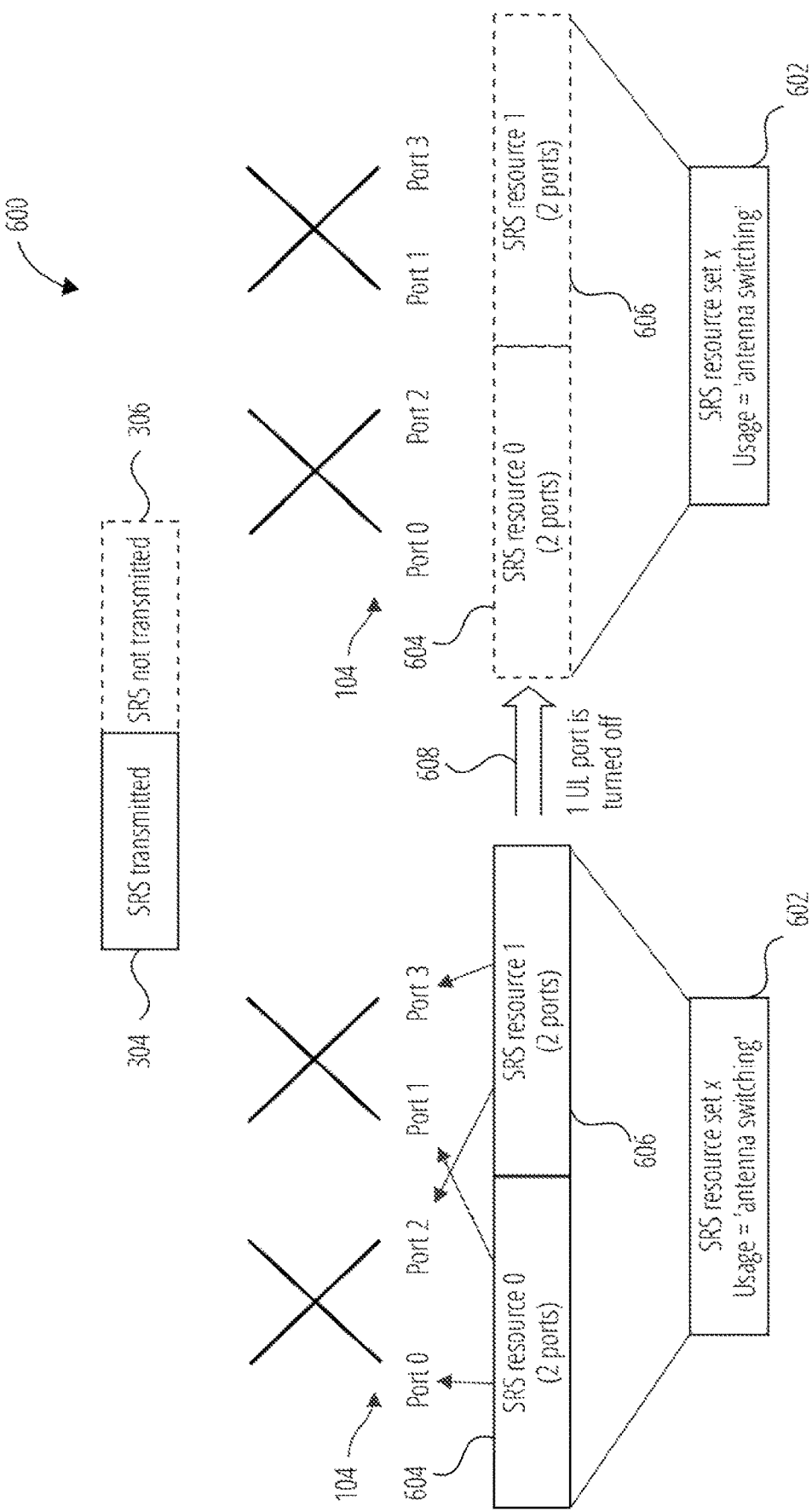
FIG. 6 illustrates an example of SRS antenna switching when one or more uplink ports are turned off in accordance with one embodiment.

For example, FIG. 6 illustrates an example of SRS antenna switching 600 when one or more UL ports are turned off according to one embodiment. In this example, an SRS resource set 602 configured for antenna switching usage (Usage='antenna switching' or usage at least includes antenna switching) includes a first SRS resource 604 (referred to as SRS resource 0) for 2 ports and a second SRS resource 606 (referred to as SRS resource 1) for 2 ports.

Before an UL port is turned off, as represented to the left of arrow 608, the UE uses antenna switching to transmit SRS four times on one or more Tx chain to sound the channels for each of the 4 Rx chains. The SRS resource 0 is used to transmit SRS on port 0 and port 1. The SRS resource 1 is used to transmit SRS on port 2 and port 3.

After the UE turns off 1 UL port, as represented to the right of the arrow 608, the UE does not transmit SRS on any of the ports 104 using SRS resource 0 or SRS resource 1 of the SRS resource set 602. In certain embodiments, the gNB may reconfigure the SRS resource set 602 with a new SRS configuration based on x'TyR. The UE may then transmit SRS using the SRS resource set 602 configured based on x'TyR.

In one embodiment, if a UE turns off one or more UL ports such that xTyR changes to x'TyR (where x'<x), the UE transmits the SRS resource set configured with xTyR repeatedly until the number of SRS resources is larger than ceil(y/x'), wherein "ceil( )" is a mathematical function that rounds a number up the next largest whole number or integer. For each SRS resource, UE may only need to transmit SRS from x' ports.

Figure 7:
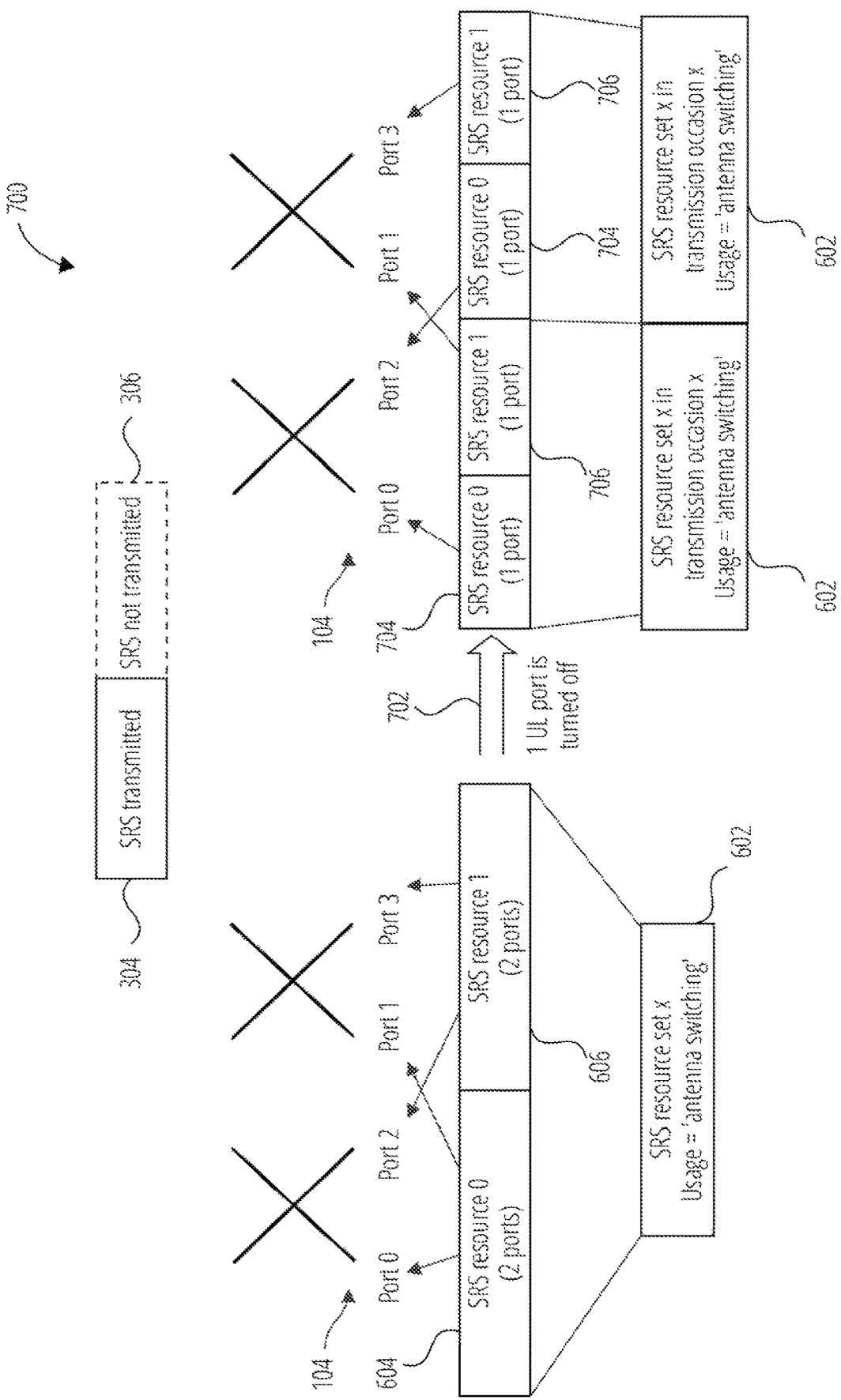
FIG. 7 illustrates an example of SRS antenna switching when one or more uplink ports are turned off in accordance with another embodiment.

For example, FIG. 7 illustrates an example of SRS antenna switching 700 when one or more UL ports are turned off according to one embodiment. Before an UL port is turned off, as represented to the left of arrow 702, similar to FIG. 6, the SRS resource set 602 includes the first SRS resource 604 (referred to as SRS resource 0) for 2 ports and the second SRS resource 606 (referred to as SRS resource 1) for 2 ports. The UE uses antenna switching to transmit SRS four times on one or more Tx chain to sound the channels for each of the 4 Rx chains. The SRS resource 0 is used to transmit SRS on port 0 and port 1. The SRS resource 1 is used to transmit SRS on port 2 and port 3.

After the UE turns off 1 UL port, as represented to the right of the arrow 702, the UE transmits SRS in two different transmission occasions of the SRS resource set 602 using a first SRS resource 704 (referred to as SRS resource 0) for 1 port and a second SRS resource 706 (referred to as SRS resource 1) for 1 port. In a first transmission occasion (x), the UE transmits SRS using the SRS resource 0 on port 0 and the SRS resource 1 on port 1. In the second transmission occasion (x+1), the UE transmits SRS using the SRS resource 0 on port 2 and the SRS resource 1 on port 3. Thus, even after turning off one UL port, the UE continues to use antenna switching to transmit SRS four times to sound the channels for each of the 4 Rx chains.

Turning Off at Least One UL Port and at Least One DL Port.

In one embodiment, if a UE turns off at least one UL port and at least one DL port such that xTyR changes to x'Ty'R (where x'<x and y'<y), the UE does not transmit the SRS resource set configured with xTyR regardless of whether it is triggered or not. In certain such embodiments, the UE may only transmit the SRS resource set for antenna switching when it is configured with x'Ty'R. After the gNB reconfigures the SRS resource set with a new SRS configuration based on x'Ty'R, the UE may transmit SRS using the SRS resource set configured based on x'Ty'R.

In another embodiment, if a UE turns off at least one UL port and at least one DL port such that xTyR changes to x'Ty'R (where x'<x and y'<y), and if ceil(y'/x') is larger than ceil(y/x), which means more SRS resources are required, the UE transmits the SRS resource set configured with xTyR repeatedly until the number of SRS resources is larger than ceil(y'/x'), as described in relation to FIG. 7. For each SRS resource, UE may only need to transmit SRS from x' ports.

In another embodiment, if a UE turns off at least one UL port and at least one DL port such that xTyR changes to x'Ty'R (where x'<x and y'<y), and if ceil(y'/x') is smaller than ceil(y/x), which means some SRS resources are redundant, the UE does not transmit the SRS resources corresponding to y-y' ports for an SRS resource set antenna switching xTyR, as described in relation to FIG. 3.

In another embodiment, if a UE turns off at least one UL port and at least one DL port such that xTyR changes to x'Ty'R (where x'<x and y'<y), and if ceil(y'/x') is smaller than ceil(y/x), which means some SRS resources are redundant, the UE transmits all the SRS resources for an SRS resource set antenna switching xTyR and the SRS resources (e.g., corresponding to y-y' Rx chains) may be re-mapped to other active DL ports to achieve repetition gain, as described in relation to FIG. 4. For example, if the UE falls back from 2T4R to 1T2R, then the UE may keep the same SRS transmission behavior but with an updated port mapping. In addition, or in other embodiments, the UE may transmit the SRS for a subset of the ports. For example, if the UE does not need to transmit SRS from two ports, the UE transmit SRS from one port for each SRS resource.

In another embodiment, if a U E turns off at least one UL port and at least one DL port such that xTyR changes to x'Ty'R (where x'<x and y'<y), the UE may let ceil(y'/x')=C and use antenna switching on SRS resource c, wherein c∈0, ..., C−2, with x' Tx chains used. The x' Tx chains are mapped to downlink ports c·X', c·X'+1, ..., c·X'+X'−1. Then the UE may use antenna switching on SRS resource c−1, with (y'−(C−1)x') Tx chains, which are mapped to downlink ports c·X', c·X'+1, ..., y'−1, c=C−2. In one example, if the UE changes from 4T8R to 2T6R, in SRS resource 1, the UE transmits 2 ports, which are mapped to DL antenna 1 and antenna 2. In SRS resource 2, the UE transmits 2 ports, which are mapped to antenna 3 and antenna 4. In this example, antenna 5 and antenna 6 are left un-sounded.

When y is not an Integer Multiple of x.

In one embodiment, for an SRS resource set for antenna switching configured for xTyR, when y is not an integer multiple of x (e.g. 4T6R), the gNB can configure different SRS resources with a different antenna port in a resource set configured with antenna switching. In one example, for 4T6R, the gNB can configure a 4 port SRS+a 2 port SRS.

In another embodiment, for an SRS resource set for antenna switching configured for xTyR, when y is not an integer multiple of x (e.g. 4T6R), the gNB can configure the same number of antenna ports for all SRS resources in a resource set configured with antenna switching. In certain such embodiments, the last SRS resource can be mapped to the rest of the ports and/or some previous ports to achieve repetition gain. In one example, for 4T6R, the gNB can configure two 4 port SRS resources: SRS resource 1 is mapped to port {1, 2, 3, 4} and SRS resource 2 is mapped to port {5, 6, 1, 2}.

UE Reporting.

For certain embodiments disclosed herein, the UE may report whether it supports a new antenna configuration as x'Ty'R by UE capability messaging. If the UE does not support the new antenna configuration x'Ty'R, the UE does not transmit the SRS resource set for antenna switching when the maximum number of layers are changed to be associated with xTy'R.

In addition, or in other embodiments, similar to reporting a maximum number of preferred UL and/or DL layers, the UE can report its preferred SRS antenna switching configuration. In one example, for a UE previously configured with 2T8R, when the UE decides to turn off 1 UL antenna and 2 DL antenna, the UE can report that it prefers an SRS antenna switching configuration of 1T6R. Such a report may be carried, for example, by radio resource control (RRC) signaling, media access control (MAC) control element (CE), or physical uplink control channel (PUCCH).

Figure 8:
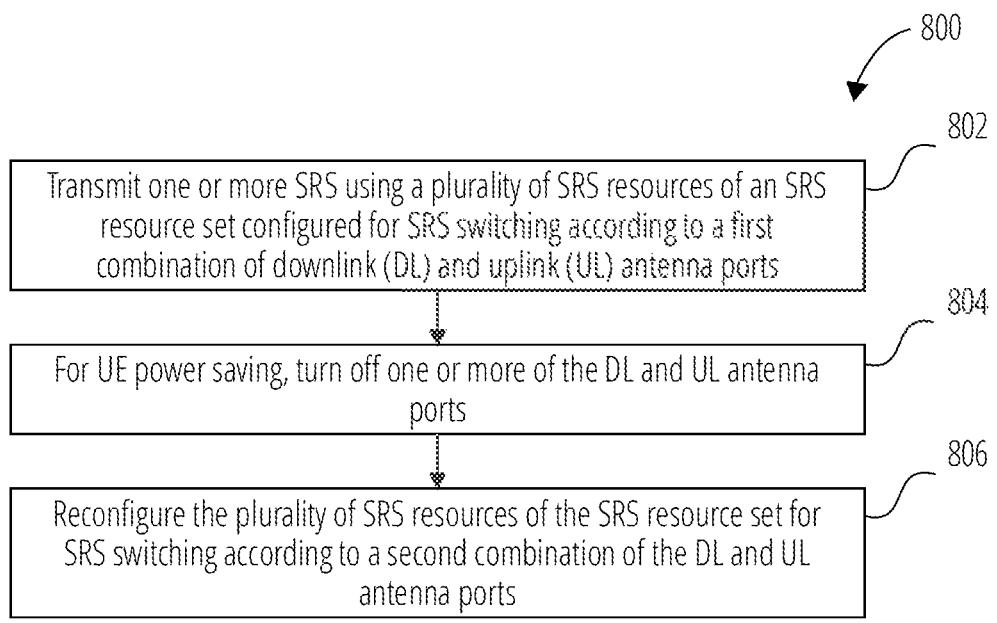
FIG. 8 illustrates a method for a UE to perform SRS switching in accordance with one embodiment.

FIG. 8 is a flowchart of a method 800 for a UE to perform SRS switching according to one embodiment. In block 802, the UE transmits one or more SRS using a plurality of SRS resources of an SRS resource set configured for SRS switching according to a first combination of downlink (DL) and uplink (UL) antenna ports. In block 804, for UE power saving, the UE turns off one or more of the DL and UL antenna ports. In block 806, the UE reconfigures the plurality of SRS resources of the SRS resource set for SRS switching according to a second combination of the DL and UL antenna ports.

In certain embodiments of the method 800, turning off one or more of the DL and UL antenna ports includes deactivating at least one DL antenna port of the first combination of DL and UL antenna ports, and reconfiguring the plurality of SRS resources includes transmitting the one or more SRS using a subset of the plurality of SRS resources based on the second combination of DL and UL antenna ports.

In certain embodiments of the method 800, turning off one or more of the DL and UL antenna ports includes deactivating at least one DL antenna port of the first combination of DL and UL antenna ports, and reconfiguring the plurality of SRS resources includes re-mapping a subset of the plurality of SRS resources to one or more active DL ports in the second combination of DL and UL antenna ports to provide repetition gain for the one or more SRS. In some embodiments, the method 800 further includes, in response to determining that a repeated SRS resource on the one or more active DL ports collides with another UL signal, dropping all of the plurality of SRS resources of the SRS resource set. In other embodiments, the method 800 further includes, in response to determining that a repeated SRS resource on the one or more active DL ports collides with another UL signal, dropping only the repeated SRS resource of the SRS resource set.

In certain embodiments of the method 800, turning off one or more of DL and UL antenna ports includes deactivating at least one DL antenna port of the first combination of DL and UL antenna ports, and reconfiguring the plurality of SRS resources includes waiting to transmit the one or more SRS using the plurality of SRS resources until an SRS configuration is received from a network device to configure the SRS resource set based on the second combination of the DL and UL antenna ports.

In certain embodiments of the method 800, turning off one or more of DL and UL antenna ports includes deactivating at least one UL antenna port of the first combination of DL and UL antenna ports, and reconfiguring the plurality of SRS resources includes waiting to transmit the one or more SRS using the plurality of SRS resources until an SRS configuration is received from a network device to configure the SRS resource set based on the second combination of the DL and UL antenna ports.

In certain embodiments of the method 800, turning off one or more of the DL and UL antenna ports includes deactivating at least one UL antenna port of the first combination of DL and UL antenna ports, and reconfiguring the plurality of SRS resources includes repeatedly transmitting the SRS resource set at different transmission occasions according to the first combination of DL and UL antenna ports until a number of transmitted SRS resources is larger than a ratio of active DL antenna ports to active UL antenna ports.

In certain embodiments of the method 800, turning off one or more of DL and UL antenna ports includes deactivating at least one DL antenna port and at least one UL antenna port of the first combination of DL and UL antenna ports, and reconfiguring the plurality of SRS resources includes waiting to transmit the one or more SRS using the plurality of SRS resources, whether it is triggered or not, until an SRS configuration is received from a network device to configure the SRS resource set based on the second combination of the DL and UL antenna ports.

In certain embodiments of the method 800, turning off one or more of DL and UL antenna ports includes deactivating at least one DL antenna port and at least one UL antenna port of the first combination of DL and UL antenna ports so as to change from xTyR antenna switching to x'Ty'R antenna switching (x'<x, y'<y), where x represents a first number of transmit (T) chains and y represents a first number of receive (R) chains corresponding to the first combination of DL and UL antenna ports, and where x' represents a second number of T chains and y' represents a second number of R chains corresponding to the second combination of DL and UL antenna ports. If ceil(y'/x') is larger than ceil(y/x) such that more SRS resources are to be used, the UE transmits the SRS resource set configured with xTyR repeatedly until the number of SRS resources is larger than ceil(y'/x'). If ceil(y'/x') is smaller than ceil(y/x) such that some SRS resources are redundant, the UE does not transmit the SRS resources corresponding to y-y' ports for an SRS resource set antenna switching xTyR, or the UE transmits all the SRS resources for an SRS resource set antenna switching xTyR and the SRS resources corresponding to y-y' receive chains are re-mapped to other active DL ports to achieve repetition gain. If ceil(y'/x') is the same as ceil(y/x), the UE changes port mapping and a transmitted port for each SRS resource and transmits the entire SRS resource set.

In certain embodiments of the method 800, turning off one or more of DL and UL antenna ports includes deactivating at least one DL antenna port and at least one UL antenna port of the first combination of DL and UL antenna ports so as to change from xTyR antenna switching to x'Ty'R antenna switching (x'<x, y'<y), where x represents a first number of transmit (T) chains and y represents a first number of receive (R) chains corresponding to the first combination of DL and UL antenna ports, where x' represents a second number of T chains and y' represents a second number of R chains corresponding to the second combination of DL and UL antenna ports, wherein ceil(y'/x')=C. The UE uses antenna switching on SRS resource c for c∈0, . . . , C−2, with x' transmit chains used, wherein the x' transmit chains are mapped to downlink ports c·X', c·X'+1, . . . , c·X'+X'−1. The UE uses antenna switching on SRS resource c−1, with (y'−(C−1)x') transmit chains, which are mapped to downlink ports c·X, c·X'+1, . . . , y'−1, c=C−2.

Figure 9:
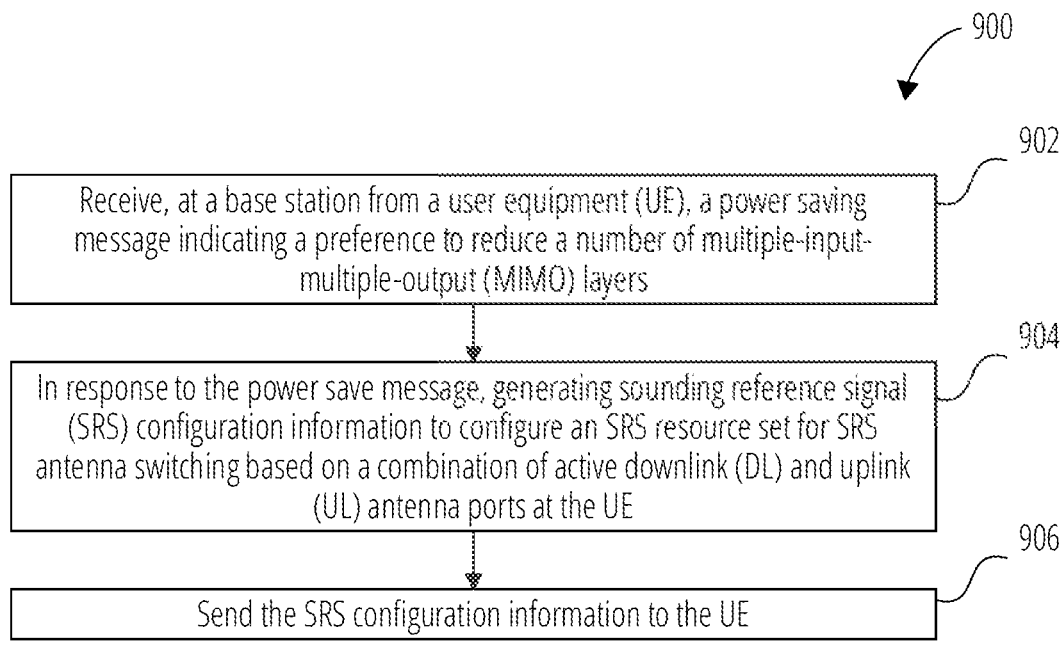
FIG. 9 illustrates a method for a base station in a wireless network in accordance with one embodiment.

FIG. 9 is a flowchart of a method 900 for a base station (e.g., a gNB or other network device) in a wireless network according to one embodiment. In block 902, the base station receives, from a user equipment, a power saving message indicating a preference to reduce a number of MIMO layers. In block 904, in response to the power saves message, the base station generates an SRS configuration information to configure an SRS resource set for SRS antenna switching based on a combination of active downlink (DL) and uplink (UL) antenna ports at the UE. In block 906, the base station sends the SRS configuration information to the UE.

Certain embodiments of the method 900 further include determining that a number of the active DL antenna ports is not an integer multiple of a number of the active UL antenna ports, and configuring different SRS resources with different antenna ports in the SRS resource set configured with SRS antenna switching.

Certain embodiments of the method 900 further include determining that a number of the active DL antenna ports is not an integer multiple of a number of the active UL antenna ports, and configuring a same number of antenna ports for all SRS resources in the SRS resource set configured with SRS antenna switching.

Certain embodiments of the method 900 further include mapping a last SRS resource of the SRS resource set to previously used ports for repetition gain.

Figure 10:
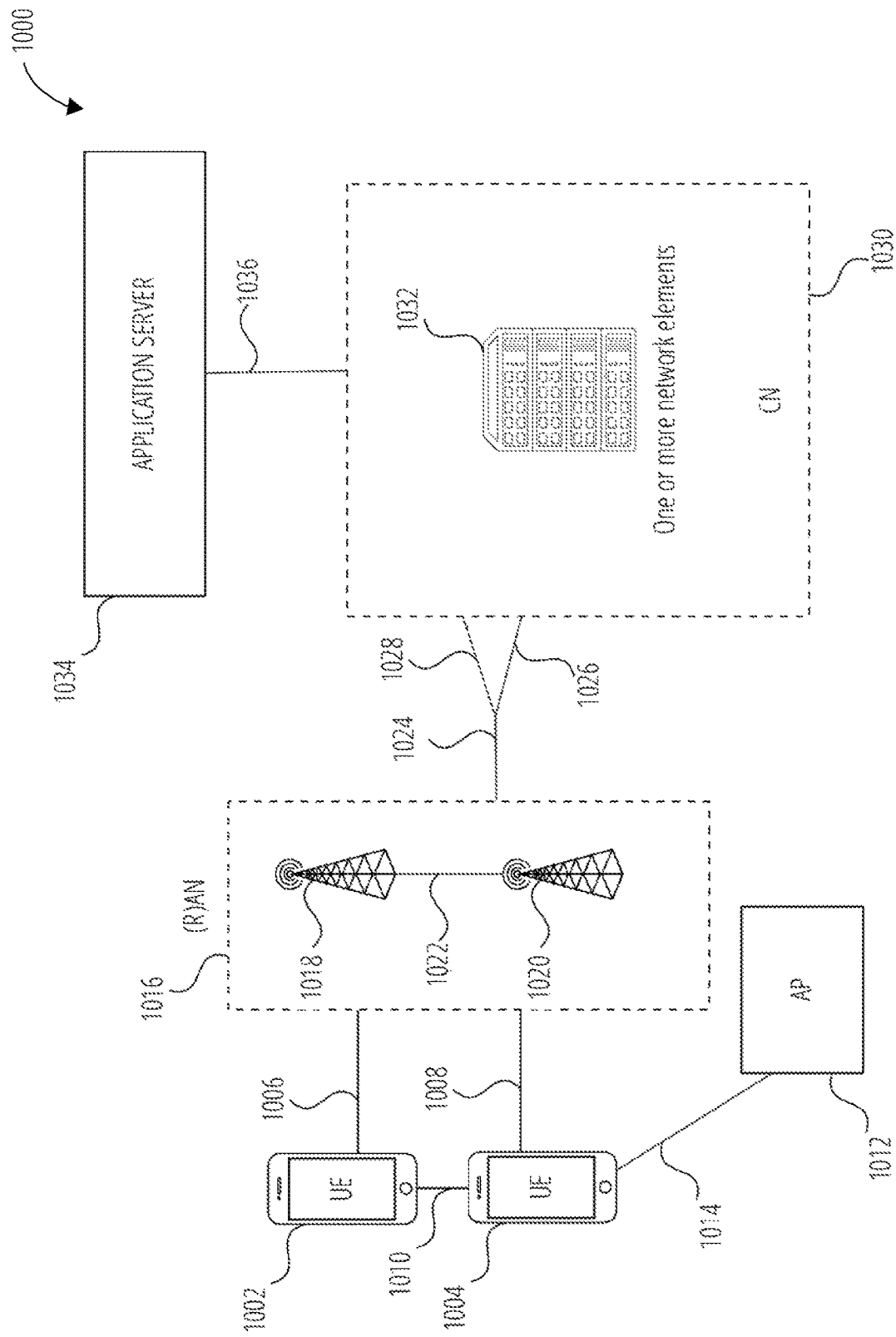
FIG. 10 illustrates a system in accordance with one embodiment.

FIG. 10 illustrates an example architecture of a system 1000 of a network, in accordance with various embodiments. The following description is provided for an example system 1000 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 10, the system 1000 includes UE 1002 and UE 1004. In this example, the UE 1002 and the UE 1004 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, the UE 1002 and/or the UE 1004 may be IoT UEs, which may comprise a network access layer designed for low power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 1002 and UE 1004 may be configured to connect, for example, communicatively couple, with an access node or radio access node (shown as (R)AN 1016). In embodiments, the (R)AN 1016 may be an NG RAN or a SG RAN, an E-UTRAN, or a legacy RAN, such as a UTRAN or GERAN. As used herein, the term "NG RAN" or the like may refer to a (R)AN 1016 that operates in an NR or SG system, and the term "E-UTRAN" or the like may refer to a (R)AN 1016 that operates in an LTE or 4G system. The UE 1002 and UE 1004 utilize connections (or channels) (shown as connection 1006 and connection 1008, respectively), each of which comprises a physical communications interface or layer (discussed in further detail below).

In this example, the connection 1006 and connection 1008 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a SG protocol, a NR protocol, and/or any of the other communications protocols discussed herein. In embodiments, the UE 1002 and UE 1004 may directly exchange communication data via a ProSe interface 1010. The ProSe interface 1010 may alternatively be referred to as a sidelink (SL) interface 110 and may comprise one or more logical channels, including but not limited to a PSCCH, a PSSCH, a PSDCH, and a PSBCH.

The UE 1004 is shown to be configured to access an AP 1012 (also referred to as "WLAN node," "WLAN," "WLAN Termination," "WT" or the like) via connection 1014. The connection 1014 can comprise a local wireless connection, such as a connection consistent with any IEEE 802.11 protocol, wherein the AP 1012 would comprise a wireless fidelity (Wi-Fi®) router. In this example, the AP 1012 may be connected to the Internet without connecting to the core network of the wireless system (described in further detail below). In various embodiments, the UE 1004, (R)AN 1016, and AP 1012 may be configured to utilize LWA operation and/or LWIP operation. The LWA operation may involve the UE 1004 in RRC_CONNECTED being configured by the RAN node 1018 or the RAN node 1020 to utilize radio resources of LTE and WLAN. LWIP operation may involve the UE 1004 using WLAN radio resources (e.g., connection 1014) via IPsec protocol tunneling to authenticate and encrypt packets (e.g., IP packets) sent over the connection 1014. IPsec tunneling may include encapsulating the entirety of original IP packets and adding a new packet header, thereby protecting the original header of the IP packets.

The (R)AN 1016 can include one or more AN nodes, such as RAN node 1018 and RAN node 1020, that enable the connection 1006 and connection 1008. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node that operates in an NR or SG system (for example, a gNB), and the term "E-UTRAN node" or the like may refer to a RAN node that operates in an LTE or 4G system 1000 (e.g., an eNB). According to various embodiments, the RAN node 1018 or RAN node 1020 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN node 1018 or RAN node 1020 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 1018 or RAN node 1020); a MAC/PHY split wherein RRC, PDCP, RLC, and MAC layers are operated by the CRAN/vBBUP and the PHY layer is operated by individual RAN nodes (e.g., RAN node 1018 or RAN node 1020); or a "lower PHY" split wherein RRC, PDCP, RLC, MAC layers and upper portions of the PHY layer are operated by the CRAN/vBBUP and lower portions of the PHY layer are operated by individual RAN nodes. This virtualized framework allows the freed-up processor cores of the RAN node 1018 or RAN node 1020 to perform other virtualized applications. In some implementations, an individual RAN node may represent individual gNB-DUs that are connected to a gNB-CU via individual F1 interfaces (not shown by FIG. 10). In these implementations, the gNB-DUs may include one or more remote radio heads or RFEMs, and the gNB-CU may be operated by a server that is located in the (R)AN 1016 (not shown) or by a server pool in a similar manner as the CRAN/vBBUP. Additionally, or alternatively, one or more of the RAN node 1018 or RAN node 1020 may be next generation eNBs (ng-eNBs), which are RAN nodes that provide E-UTRA user plane and control plane protocol terminations toward the UE 1002 and UE 1004, and are connected to an SGC via an NG interface (discussed infra). In V2X scenarios one or more of the RAN node 1018 or RAN node 1020 may be or act as RSUs.

The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/ software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

The RAN node 1018 and/or the RAN node 1020 can terminate the air interface protocol and can be the first point of contact for the UE 1002 and UE 1004. In some embodiments, the RAN node 1018 and/or the RAN node 1020 can fulfill various logical functions for the (R)AN 1016 including, but not limited to, radio network controller (RNC) functions such as radio bearer management, uplink and downlink dynamic radio resource management and data packet scheduling, and mobility management.

In embodiments, the UE 1002 and UE 1004 can be configured to communicate using OFDM communication signals with each other or with the RAN node 1018 and/or the RAN node 1020 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from the RAN node 1018 and/or the RAN node 1020 to the UE 1002 and UE 1004, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UE 1002 and UE 1004 and the RAN node 1018 and/or the RAN node 1020 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UE 1002 and UE 1004 and the RAN node 1018 or RAN node 1020 may operate using LAA, eLAA, and/or feLAA mechanisms. In these implementations, the UE 1002 and UE 1004 and the RAN node 1018 or RAN node 1020 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UE 1002 and UE 1004, RAN node 1018 or RAN node 1020, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA Here, when a WLAN node (e.g., a mobile station (MS) such as UE 1002, AP 1012, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (Its); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 1002 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UE 1002 and UE 1004. The PDCCH carries information about the transport format and resource allocations related to the PDSCH channel, among other things. It may also inform the UE 1002 and UE 1004 about the transport format, resource allocation, and HARQ information related to the uplink shared channel. Typically, downlink scheduling (assigning control and shared channel resource blocks to the UE 1004 within a cell) may be performed at any of the RAN node 1018 or RAN node 1020 based on channel quality information fed back from any of the UE 1002 and LE 1004. The downlink resource assignment information may be sent on the PDCCH used for (e.g., assigned to) each of the UE 1002 and UE 1004.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN node 1018 or RAN node 1020 may be configured to communicate with one another via interface 1022. In embodiments where the system 1000 is an LTE system (e.g., when CN 1030 is an EPC), the interface 1022 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 1002 from an SeNB for user data; information of PDCP PDUs that were not delivered to a UE 1002; information about a current minimum desired buffer size at the Se NB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 1000 is a SG or NR system (e.g., when CN 1030 is an SGC), the interface 1022 may be an Xn interface. The Xn interface is defined between two or more RAN nodes (e.g., two or more gNBs and the like) that connect to SGC, between a RAN node 1018 (e.g., a gNB) connecting to SGC and an eNB, and/or between two eNBs connecting to 5GC (e.g., CN 1030). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 1002 in a connected mode (e.g., CM-CONNECTED) including functionality to manage the UE mobility for connected mode between one or more RAN node 1018 or RAN node 1020. The mobility support may include context transfer from an old (source) serving RAN node 1018 to new (target) serving RAN node 1020; and control of user plane tunnels between old (source) serving RAN node 1018 to new (target) serving RAN node 1020. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The (R)AN 1016 is shown to be communicatively coupled to a core network-in this embodiment, CN 1030. The CN 1030 may comprise one or more network elements 1032, which are configured to offer various data and telecommunications services to customers/subscribers (e.g., users of UE 1002 and UE 1004) who are connected to the CN 1030 via the (R)AN 1016. The components of the CN 1030 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 1030 may be referred to as a network slice, and a logical instantiation of a portion of the CN 1030 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 1034 may be an element offering applications that use IP bearer resources with the core network (e.g., UMTS PS domain, LTE PS data services, etc.). The application server 1034 can also be configured to support one or more communication services (e.g., VoIP sessions, PTT sessions, group communication sessions, social networking services, etc.) for the UE 1002 and UE 1004 via the EPC. The application server 1034 may communicate with the CN 1030 through an IP communications interface 1036.

In embodiments, the CN 1030 may be an SGC, and the (R)AN 116 may be connected with the CN 1030 via an NG interface 1024. In embodiments, the NG interface 1024 may be split into two parts, an NG user plane (NG-U) interface 1026, which carries traffic data between the RAN node 1018 or RAN node 1020 and a UPF, and the S1 control plane (NG-C) interface 1028, which is a signaling interface between the RAN node 1018 or RAN node 1020 and AMFs.

In embodiments, the CN 1030 may be a SG CN, while in other embodiments, the CN 1030 may be an EPC). Where CN 1030 is an EPC, the (R)AN 116 may be connected with the CN 1030 via an S1 interface 1024. In embodiments, the S1 interface 1024 may be split into two parts, an S1 user plane (S1-U) interface 1026, which carries traffic data between the RAN node 1018 or RAN node 1020 and the S-GW, and the S1-MME interface 1028, which is a signaling interface between the RAN node 1018 or RAN node 1020 and MMEs.

Example System Architecture

In certain embodiments, 5G System architecture supports data connectivity and services enabling deployments to use techniques such as Network Function Virtualization and Software Defined Networking. The 5G System architecture may leverage service-based interactions between Control Plane Network Functions. Separating User Plane functions from the Control Plane functions allows independent scalability, evolution, and flexible deployments (e.g., centralized location or distributed (remote) location). Modularized function design allows for function re-use and may enable flexible and efficient network slicing. A Network Function and its Network Function Services may interact with another NF and its Network Function Services directly or indirectly via a Service Communication Proxy. Another intermediate function may help route Control Plane messages. The architecture minimizes dependencies between the AN and the CN. The architecture may include a converged core network with a common AN-CN interface that integrates different Access Types (e.g., 3GPP access and non-3GPP access). The architecture may also support a unified authentication framework, stateless NFs where the compute resource is decoupled from the storage resource, capability exposure, concurrent access to local and centralized services (to support low latency services and access to local data networks, User Plane functions can be deployed close to the AN), and/or roaming with both Home routed traffic as well as Local breakout traffic in the visited PLMN.

The 5G architecture may be defined as service-based and the interaction between network functions may include a service-based representation, where network functions (e.g., AMF) within the Control Plane enable other authorized network functions to access their services. The service-based representation may also include point-to-point reference points. A reference point representation may also be used to show the interactions between the NF services in the network functions described by point-to-point reference point (e.g., N11) between any two network functions (e.g., AMF and SMF).

Figure 11:
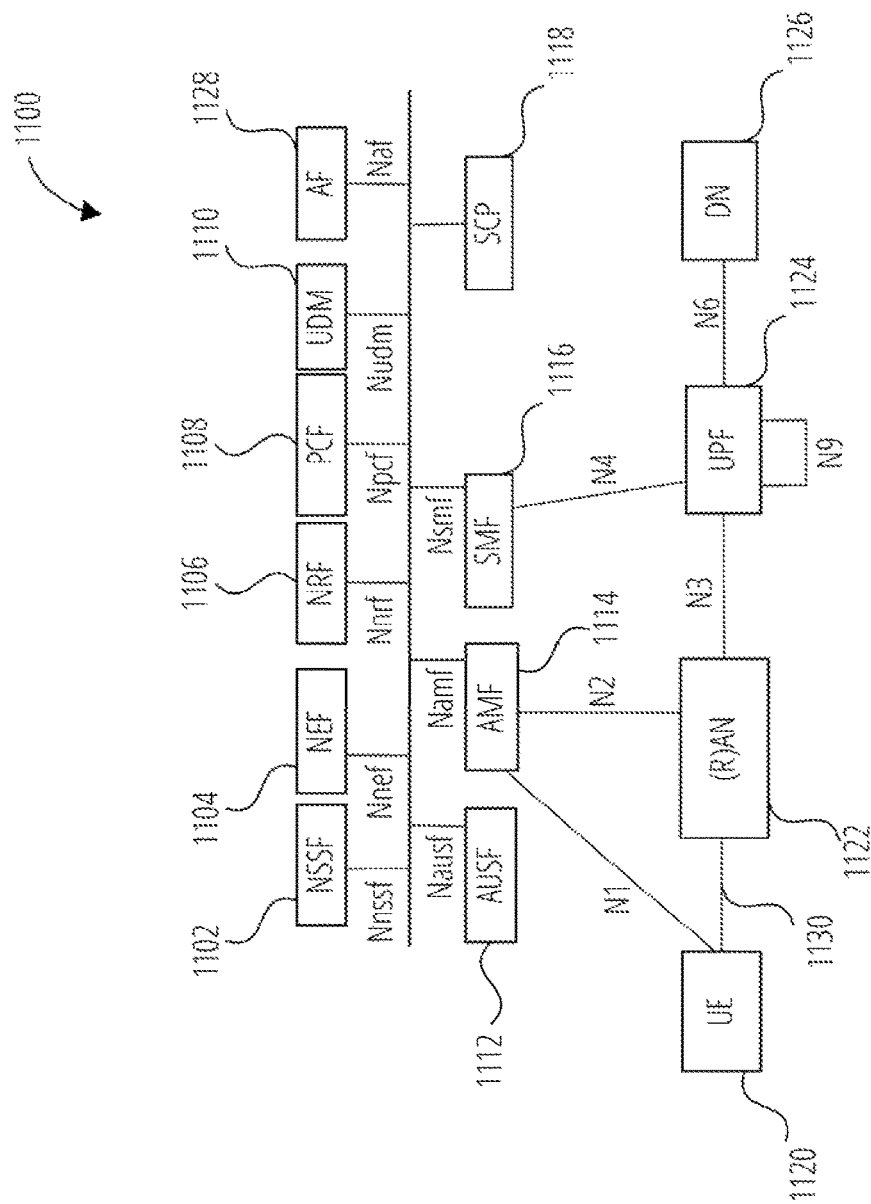
FIG. 11 illustrates an example service based architecture 1100 in accordance with certain embodiments.

FIG. 11 illustrates a service based architecture 1100 in 5GS according to one embodiment. As described in 3GPP TS 23.501, the service based architecture 1100 comprises NFs such as an NSSF 1102, a NEF 1104, an NRF 1106, a PCF 1108, a UDM 1110, an AUSF 1112, an AMF 1114, an SMF 1116, for communication with a UE 1120, a (R)AN 1122, a UPF 1124, and a DN 1126. The NFs and NF services can communicate directly, referred to as Direct Communication, or indirectly via a SCP 1118, referred to as Indirect Communication. FIG. 11 also shows corresponding service-based interfaces including Nutm, Naf, Nudm, Npcf, Nsmf, Nnrf, Namf, Nnef, Nnssf, and Nausf, as well as reference points N1, N2, N3, N4, and N6. A few example functions provided by the NFs shown in FIG. 11 are described below.

The NSSF 1102 supports functionality such as: selecting the set of Network Slice instances serving the UE: determining the Allowed NSSAI and, if needed, mapping to the Subscribed S-NSSAIs; determining the Configured NSSAI and, if needed, the mapping to the Subscribed S-NSSAIs; and/or determining the AMF Set to be used to serve the UE, or, based on configuration, a list of candidate AMF(s), possibly by querying the NRF.

The NEF 1104 supports exposure of capabilities and events. NF capabilities and events may be securely exposed by the NEF 1104 (e.g., for 3rd party, Application Functions, and/or Edge Computing). The NEF 1104 may store/retrieve information as structured data using a standardized interface (Nudr) to a UDR. The NEF 1104 may also secure provision of information from an external application to 3GPP network and may provide for the Application Functions to securely provide information to the 3GPP network (e.g., expected UE behavior, 5GLAN group information, and service specific information), wherein the NEF 1104 may authenticate and authorize and assist in throttling the Application Functions. The NEF 1104 may provide translation of internal-external information by translating between information exchanged with the AF and information exchanged with the internal network function. For example, the NEF 1104 translates between an AF-Service-Identifier and internal 5G Core information such as DNN and S-NSSAI. The NEF 1104 may handle masking of network and user sensitive information to external AF's according to the network policy. The NEF 1104 may receive information from other network functions (based on exposed capabilities of other network functions), and stores the received information as structured data using a standardized interface to a UDR. The stored information can be accessed and re-exposed by the NEF 1104 to other network functions and Application Functions, and used for other purposes such as analytics. For external exposure of services related to specific UE(s), the NEF 1104 may reside in the HPLMN. Depending on operator agreements, the NEF 1104 in the HPLMN may have interface(s) with NF(s) in the VPLMN. When a UE is capable of switching between EPC and 5GC, an SCEF+NEF may be used for service exposure.

The NRF 1106 supports service discovery function by receiving an NF Discovery Request from an NF instance or SCP and providing the information of the discovered NF instances to the NF instance or SCP. The NRF 1106 may also support P-CSCF discovery (specialized case of AF discovery by SMF), maintains the NF profile of available NF instances and their supported services, and/or notify about newly registered/updated/deregistered NF instances along with its NF services to the subscribed NF service consumer or SCP. In the context of Network Slicing, based on network implementation, multiple NRFs can be deployed at different levels such as a PLMN level (the NRF is configured with information for the whole PLMN), a shared-slice level (the NRF is configured with information belonging to a set of Network Slices), and/or a slice-specific level (the NRF is configured with information belonging to an S-NSSAI). In the context of roaming, multiple NRFs may be deployed in the different networks, wherein the NRF(s) in the Visited PLMN (known as the vNRF) are configured with information for the visited PLMN, and wherein the NRF(s) in the Home PLMN (known as the hNRF) are configured with information for the home PLMN, referenced by the vNRF via an N27 interface.

The PCF 1108 supports a unified policy framework to govern network behavior. The PCF 1108 provides policy rules to Control Plane function(s) to enforce them. The PCF 1108 accesses subscription information relevant for policy decisions in a Unified Data Repository (UDR). The PCF 1108 may access the UDR located in the same PLMN as the PCF.

The UDM 1110 supports generation of 3GPP AKA Authentication Credentials, User Identification Handling (e.g., storage and management of SUPI for each subscriber in the 5G system), de-concealment of a privacy-protected subscription identifier (SUCI), access authorization based on subscription data (e.g., roaming restrictions), UE's Serving NF Registration Management (e.g., storing serving AMF for UE, storing serving SMF for UE's PDU Session), service/session continuity (e.g., by keeping SMF/DNN assignment of ongoing sessions. MT-SMS delivery, Lawful Intercept Functionality (especially in outbound roaming cases where a UDM is the only point of contact for LI), subscription management, SMS management, 5GLAN group management handling, and/or external parameter provisioning (Expected UE Behavior parameters or Network Configuration parameters). To provide such functionality, the UDM 1110 uses subscription data (including authentication data) that may be stored in a UDR, in which case a UDM implements the application logic and may not require an internal user data storage and several different UDMs may serve the same user in different transactions. The UDM 1110 may be located in the HPLMN of the subscribers it serves, and may access the information of the UDR located in the same PLMN.

The AF 1128 interacts with the Core Network to provide services that, for example, support the following: application influence on traffic routing; accessing the NEF 1104; interacting with the Policy framework for policy control; and/or IMS interactions with 5GC. Based on operator deployment, Application Functions considered to be trusted by the operator can be allowed to interact directly with relevant Network Functions. Application Functions not allowed by the operator to access directly the Network Functions may use the external exposure framework via the NEF 1104 to interact with relevant Network Functions.

The AUSF 1112 supports authentication for 3GPP access and untrusted non-3GPP access. The AUSF 1112 may also provide support for Network Slice-Specific Authentication and Authorization.

The AMF 1114 supports termination of RAN CP interface (N2), termination of NAS (N1) for NAS ciphering and integrity protection, registration management, connection management, reachability management, Mobility Management, lawful intercept (for AMF events and interface to LI System), transport for SM messages between UE and SMF, transparent proxy for routing SM messages, Access Authentication, Access Authorization, transport for SMS messages between UE and SMSF, SEAF, Location Services management for regulatory services, transport for Location Services messages between UE and LMF as well as between RAN and LMF, EPS Bearer ID allocation for interworking with EPS, UE mobility event notification, Control Plane CIoT 5GS Optimization, User Plane CIoT 5GS Optimization, provisioning of external parameters (Expected UE Behavior parameters or Network Configuration parameters), and/or Network Slice-Specific Authentication and Authorization. Some or all of the AMF functionalities may be supported in a single instance of the AMF 1114. Regardless of the number of Network functions, in certain embodiments there is only one NAS interface instance per access network between the UE and the CN, terminated at one of the Network functions that implements at least NAS security and Mobility Management. The AMF 1114 may also include policy related functionalities.

In addition to the functionalities described above, the AMF 1114 may include the following functionality to support non-3GPP access networks: support of N2 interface with N3IWF/TNGF, over which some information (e.g., 3GPP Cell Identification) and procedures (e.g., Handover related) defined over 3GPP access may not apply, and non-3GPP access specific information may be applied that do not apply to 3GPP accesses; support of NAS signaling with a UE over N3IWF/TNGF, wherein some procedures supported by NAS signaling over 3GPP access may be not applicable to untrusted non-3GPP (e.g., Paging) access; support of authentication of UEs connected over N3IWF/TNGF; management of mobility, authentication, and separate security context state(s) of a UE connected via a non-3GPP access or connected via a 3GPP access and a non-3GPP access simultaneously; support a coordinated RM management context valid over a 3GPP access and a Non 3GPP access; and/or support dedicated CM management contexts for the UE for connectivity over non-3GPP access. Not all of the above functionalities may be required to be supported in an instance of a Network Slice.

The SMF 1116 supports Session Management (e.g., Session Establishment, modify and release, including tunnel maintain between UPF and AN node), UE IP address allocation & management (including optional Authorization) wherein the UE IP address may be received from a UPF or from an external data network, DHCPv4 (server and client) and DHCPv6 (server and client) functions, functionality to respond to Address Resolution Protocol requests and/or IPv6 Neighbor Solicitation requests based on local cache information for the Ethernet PDUs (e.g., the SMF responds to the ARP and/or the IPv6 Neighbor Solicitation Request by providing the MAC address corresponding to the IP address sent in the request), selection and control of User Plane functions including controlling the UPF to proxy ARP or IPv6 Neighbor Discovery or to forward all ARP/IPv6 Neighbor Solicitation traffic to the SMF for Ethernet PDU Sessions, traffic steering configuration at the UPF to route traffic to proper destinations, 5G VN group management (e.g., maintain the topology of the involved PSA UPFs, establish and release the N19 tunnels between PSA UPFs, configure traffic forwarding at UPF to apply local switching, and/or N6-based forwarding or N19-based forwarding), termination of interfaces towards Policy control functions, lawful intercept (for SM events and interface to LI System), charging data collection and support of charging interfaces, control and coordination of charging data collection at the UPF, termination of SM parts of NAS messages, Downlink Data Notification, Initiator of AN specific SM information sent via AMF over N2 to AN, determination of SSC mode of a session, Control Plane CIoT 5GS Optimization, header compression, acting as I-SMF in deployments where I-SMF can be inserted/removed/relocated, provisioning of external parameters (Expected UE Behavior parameters or Network Configuration parameters), P-CSCF discovery for IMS services, roaming functionality (e.g., handle local enforcement to apply QoS SLAs (VPLMN), charging data collection and charging interface (VPLMN), and/or lawful intercept (in VPLMN for SM events and interface to LI System), interaction with external DN for transport of signaling for PDU Session authentication/authorization by external DN, and/or instructing UPF and NG-RAN to perform redundant transmission on N3/N9 interfaces. Some or all of the SMF functionalities may be supported in a single instance of a SMF. However, in certain embodiments, not all of the functionalities are required to be supported in an instance of a Network Slice. In addition to the functionalities, the SMF 1116 may include policy related functionalities.

The SCP 1118 includes one or more of the following functionalities: indirect Communication; Delegated Discovery; message forwarding and routing to destination NF/NF services; communication security (e.g., authorization of the NF Service Consumer to access the NF Service Producer's API), load balancing, monitoring, overload control, etc.; and/or optionally interact with the UDR, to resolve the UDM Group ID/UDR Group ID/AUSF Group ID/PCF Group ID/CHF Group ID/HSS Group ID based on UE identity (e.g., SUPI or IMPI/IMPU). Some or all of the SCP functionalities may be supported in a single instance of an SCP. In certain embodiments, the SCP 1118 may be deployed in a distributed manner and/or more than one SCP can be present in the communication path between NF Services. SCPs can be deployed at PLMN level, shared-slice level, and slice-specific level. It may be left to operator deployment to ensure that SCPs can communicate with relevant NRFs.

The UE 1120 may include a device with radio communication capabilities. For example, the UE 1120 may comprise a smartphone (e.g., handheld touchscreen mobile computing devices connectable to one or more cellular networks). The UE 1120 may also comprise any mobile or non-mobile computing device, such as Personal Data Assistants (PDAs), pagers, laptop computers, desktop computers, wireless handsets, or any computing device including a wireless communications interface. A UE may also be referred to as a client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. The UE 1120 may comprise an IoT UE, which can comprise a network access layer designed for low-power IoT applications utilizing short-lived UE connections. An IoT UE can utilize technologies (e.g., M2M, MTC, or mMTC technology) for exchanging data with an MTC server or device via a PLMN, other UEs using ProSe or D2D communications, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure). The IoT UEs may execute background applications (e.g., keep-alive messages, status updates, etc.) to facilitate the connections of the IoT network.

The UE 1120 may be configured to connect or communicatively couple with the (R)AN 1122 through a radio interface 1130, which may be a physical communication interface or layer configured to operate with cellular communication protocols such as a GSM protocol, a CDMA network protocol, a Push-to-Talk (PTT) protocol, a PTT over Cellular (POC) protocol, a UMTS protocol, a 3GPP LTE protocol, a 5G protocol, a NR protocol, and the like. For example, the UE 1120 and the (R)AN 1122 may use a Uu interface (e.g., an LTE-Uu interface) to exchange control plane data via a protocol stack comprising a PHY layer, a MAC layer, an RLC layer, a PDCP layer, and an RRC layer. A DL transmission may be from the (R)AN 1122 to the UE 1120 and a UL transmission may be from the UE 1120 to the (R)AN 1122. The UE 1120 may further use a sidelink to communicate directly with another UE (not shown) for D2D, P2P, and/or ProSe communication. For example, a ProSe interface may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The (R)AN 1122 can include one or more access nodes, which may be referred to as base stations (BSs), NodeBs, evolved NodeBs (eNBs), next Generation NodeBs (gNB), RAN nodes, controllers, transmission reception points (TRPs), and so forth, and can comprise ground stations (e.g., terrestrial access points) or satellite stations providing coverage within a geographic area (e.g., a cell). The (R)AN 1122 may include one or more RAN nodes for providing macrocells, picocells, femtocells, or other types of cells. A macrocell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having an association with the femtocell (e.g., UEs in a Closed Subscriber Group (CSG), UEs for users in the home, etc.).

Although not shown, multiple RAN nodes (such as the (R)AN 1122) may be used, wherein an Xn interface is defined between two or more nodes. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for the UE 1120 in a connected mode (e.g., CM-CONNECTED) including functionality to manage the UE mobility for connected mode between one or more (R)AN nodes. The mobility support may include context transfer from an old (source) serving (R)AN node to new (target) serving (R)AN node; and control of user plane tunnels between old (source) serving (R)AN node to new (target) serving (R)AN node.

The UPF 1124 may act as an anchor point for intra-RAT and inter-RAT mobility, an external PDU session point of interconnect to the DN 1126, and a branching point to support multi-homed PDU session. The UPF 1124 may also perform packet routing and forwarding, packet inspection, enforce user plane part of policy rules, lawfully intercept packets (UP collection); traffic usage reporting, perform QoS handling for user plane (e.g. packet filtering, gating. UL/DL rate enforcement), perform Uplink Traffic verification (e.g., SDF to QoS flow mapping), transport level packet marking in the uplink and downlink, and downlink packet buffering and downlink data notification triggering. The UPF 1124 may include an uplink classifier to support routing traffic flows to a data network. The DN 1126 may represent various network operator services, Internet access, or third party services. The DN 1126 may include, for example, an application server.

Figure 12:
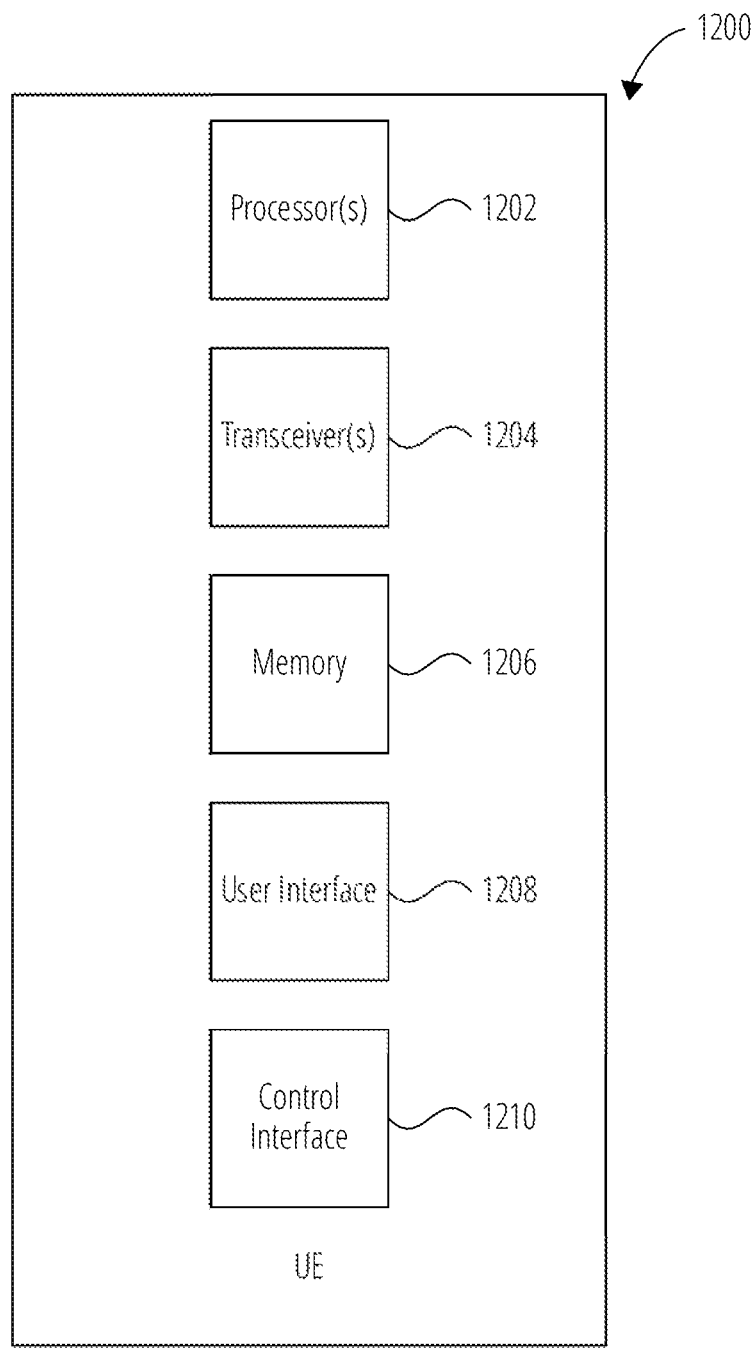
FIG. 12 illustrates a UE in accordance with one embodiment.

FIG. 12 is a block diagram of an example UE 1200 configurable according to various embodiments of the present disclosure, including by execution of instructions on a computer-readable medium that correspond to any of the example methods and/or procedures described herein. The UE 1200 comprises one or more processor 1202, transceiver 1204, memory 1206, user interface 1208, and control interface 1210.

The one or more processor 1202 may include, for example, an application processor, an audio digital signal processor, a central processing unit, and/or one or more baseband processors. Each of the one or more processor 1202 may include internal memory and/or may include interface(s) to communication with external memory (including the memory 1206). The internal or external memory can store software code, programs, and/or instructions for execution by the one or more processor 1202 to configure and/or facilitate the UE 1200 to perform various operations, including operations described herein. For example, execution of the instructions can configure the UE 1200 to communicate using one or more wired or wireless communication protocols, including one or more wireless communication protocols standardized by 3GPP such as those commonly known as 5G/NR, LTE, LTE-A, UMTS, HSPA, GSM, GPRS, EDGE, etc., or any other current or future protocols that can be utilized in conjunction with the one or more transceiver 1204, user interface 1208, and/or control interface 1210. As another example, the one or more processor 1202 may execute program code stored in the memory 1206 or other memory that corresponds to MAC, RLC, PDCP, and RRC layer protocols standardized by 3GPP (e.g., for NR and/or LTE). As a further example, the processor 1202 may execute program code stored in the memory 1206 or other memory that, together with the one or more transceiver 1204, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

The memory 1206 may comprise memory area for the one or more processor 1202 to store variables used in protocols, configuration, control, and other functions of the UE 1200, including operations corresponding to, or comprising, any of the example methods and/or procedures described herein. Moreover, the memory 1206 may comprise non-volatile memory (e.g., flash memory), volatile memory (e.g., static or dynamic RAM), or a combination thereof. Furthermore, the memory 1206 may interface with a memory slot by which removable memory cards in one or more formats (e.g., SD Card, Memory Stick, Compact Flash, etc.) can be inserted and removed.

The one or more transceiver 1204 may include radio-frequency transmitter and/or receiver circuitry that facilitates the UE 1200 to communicate with other equipment supporting like wireless communication standards and/or protocols. For example, the one or more transceiver 1204 may include switches, mixer circuitry, amplifier circuitry, filter circuitry, and synthesizer circuitry. Such RF circuitry may include a receive signal path with circuitry to down-convert RF signals received from a front-end module (FEM) and provide baseband signals to a baseband processor of the one or more processor 1202. The RF circuitry may also include a transmit signal path which may include circuitry to up-convert baseband signals provided by a baseband processor and provide RF output signals to the FEM for transmission. The FEM may include a receive signal path that may include circuitry configured to operate on RF signals received from one or more antennas, amplify the received signals and provide the amplified versions of the received signals to the RF circuitry for further processing. The FEM may also include a transmit signal path that may include circuitry configured to amplify signals for transmission provided by the RF circuitry for transmission by one or more antennas. In various embodiments, the amplification through the transmit or receive signal paths may be done solely in the RF circuitry, solely in the FEM, or in both the RF circuitry and the FEM circuitry. In some embodiments, the FEM circuitry may include a TX/RX switch to switch between transmit mode and receive mode operation.

In some exemplary embodiments, the one or more transceiver 1204 includes a transmitter and a receiver that enable device 1200 to communicate with various 5G/NR networks according to various protocols and/or methods proposed for standardization by 3 GPP and/or other standards bodies. For example, such functionality can operate cooperatively with the one or more processor 1202 to implement a PHY layer based on OFDM, OFDMA, and/or SC-FDMA technologies, such as described herein with respect to other figures.

The user interface 1208 may take various forms depending on particular embodiments, or can be absent from the UE 1200. In some embodiments, the user interface 1208 includes a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1200 may comprise a tablet computing device including a larger touchscreen display. In such embodiments, one or more of the mechanical features of the user interface 1208 may be replaced by comparable or functionally equivalent virtual user interface features (e.g., virtual keypad, virtual buttons, etc.) implemented using the touchscreen display, as familiar to persons of ordinary skill in the art. In other embodiments, the UE 1200 may be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many example embodiments of the UE 1200 having a touch screen display are capable of receiving user inputs, such as inputs related to exemplary methods and/or procedures described herein or otherwise known to persons of ordinary skill in the art.

In some exemplary embodiments of the present disclosure, the UE 1200 may include an orientation sensor, which can be used in various ways by features and functions of the UE 1200. For example, the UE 1200 can use outputs of the orientation sensor to determine when a user has changed the physical orientation of the UE 1200's touch screen display. An indication signal from the orientation sensor can be available to any application program executing on the UE 1200, such that an application program can change the orientation of a screen display (e.g., from portrait to landscape) automatically when the indication signal indicates an approximate 90-degree change in physical orientation of the device. In this manner, the application program can maintain the screen display in a manner that is readable by the user, regardless of the physical orientation of the device. In addition, the output of the orientation sensor can be used in conjunction with various exemplary embodiments of the present disclosure.

The control interface 1210 may take various forms depending on particular embodiments. For example, the control interface 1210 may include an RS-232 interface, an RS-485 interface, a USB interface, an HDMI interface, a Bluetooth interface, an IEEE ("Firewire") interface, an I²C interface, a PCMCIA interface, or the like. In some exemplary embodiments of the present disclosure, control interface 1260 can comprise an IEEE 802.3 Ethernet interface such as described above. In some embodiments of the present disclosure, the control interface 1210 may include analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 1200 may include more functionality than is shown in FIG. 12 including, for example, a video and/or still-image camera, microphone, media player and/or recorder, etc. Moreover, the one or more transceiver 1204 may include circuitry for communication using additional radio-frequency communication standards including Bluetooth, GPS, and/or others. Moreover, the one or more processor 1202 may execute software code stored in the memory 1206 to control such additional functionality. For example, directional velocity and/or position estimates output from a GPS receiver can be available to any application program executing on the UE 1200, including various exemplary methods and/or computer-readable media according to various exemplary embodiments of the present disclosure.

Figure 13:
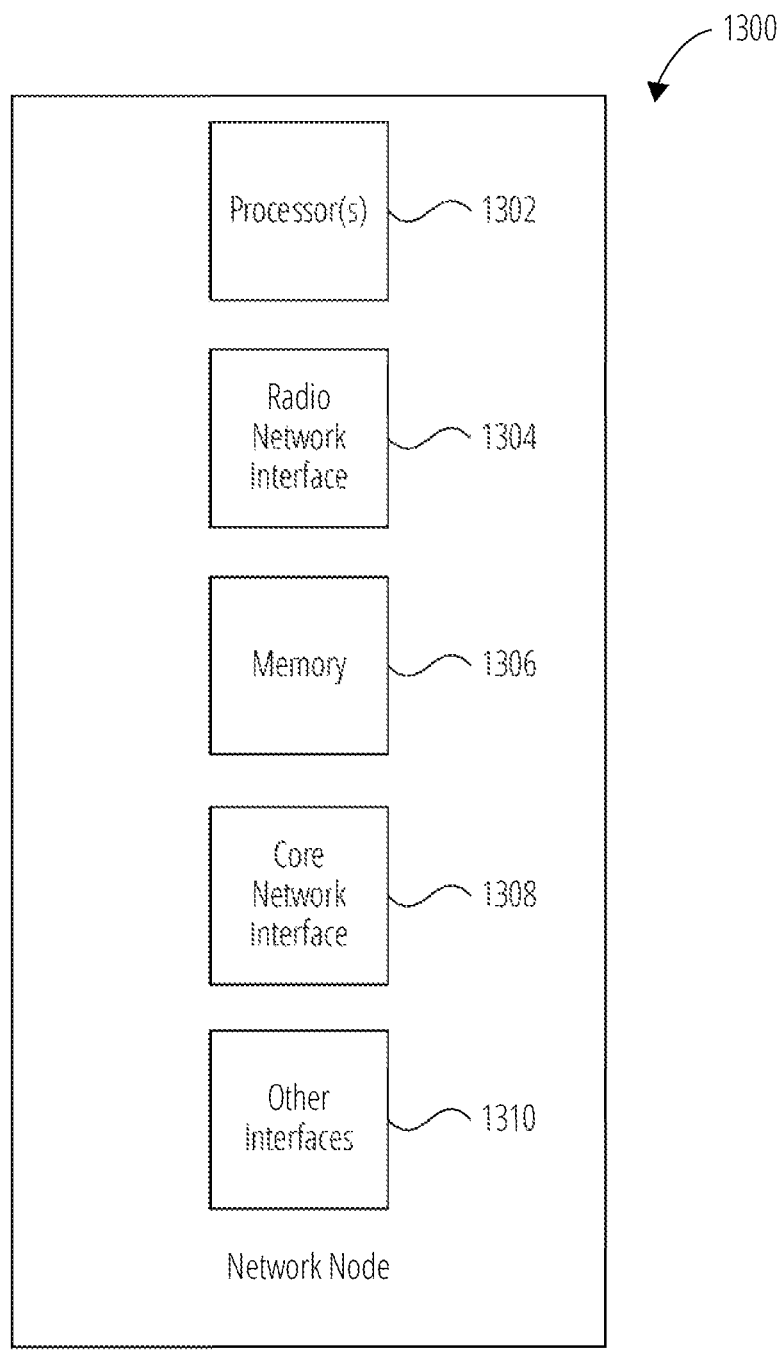
FIG. 13 illustrates a network node in accordance with one embodiment.

FIG. 13 is a block diagram of an example network node 1300 configurable according to various embodiments of the present disclosure, including by execution of instructions on a computer-readable medium that correspond to any of the example methods and/or procedures described herein.

The network node 1300 includes a one or more processor 1302, a radio network interface 1304, a memory 1306, a core network interface 1308, and other interfaces 1310. The network node 1300 may comprise, for example, a base station, eNB, gNB, access node, or component thereof.

The one or more processor 1302 may include any type of processor or processing circuitry and may be configured to perform an of the methods or procedures disclosed herein. The memory 1306 may store software code, programs, and/or instructions executed by the one or more processor 1302 to configure the network node 1300 to perform various operations, including operations described herein. For example, execution of such stored instructions can configure the network node 1300 to communicate with one or more other devices using protocols according to various embodiments of the present disclosure, including one or more methods and/or procedures discussed above. Furthermore, execution of such stored instructions can also configure and/or facilitate the network node 1300 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with the radio network interface 1304 and the core network interface 1308. By way of example and without limitation, the core network interface 1308 comprise an S1 interface and the radio network interface 1304 may comprise a Uu interface, as standardized by 3GPP. The memory 1306 may also store variables used in protocols, configuration, control, and other functions of the network node 1300. As such, the memory 1306 may comprise non-volatile memory (e.g., flash memory, hard disk, etc.), volatile memory (e.g., static or dynamic RAM), network-based (e.g., "cloud") storage, or a combination thereof.

The radio network interface 1304 may include transmitters, receivers, signal processors, ASICs, antennas, beamforming units, and other circuitry that enables network node 1300 to communicate with other equipment such as, in some embodiments, a plurality of compatible user equipment (UE). In some embodiments, the network node 1300 may include various protocols or protocol layers, such as the PHY, MAC, RLC, PDCP, and RRC layer protocols standardized by 3GPP for LTE, LTE-A, and/or 5G/NR. According to further embodiments of the present disclosure, the radio network interface 1304 may include a PHY layer based on OFDM, OFDMA, and/or SC-FDMA technologies. In some embodiments, the functionality of such a PHY layer can be provided cooperatively by the radio network interface 1304 and the one or more processor 1302.

The core network interface 1308 may include transmitters, receivers, and other circuitry that enables the network node 1300 to communicate with other equipment in a core network such as, in some embodiments, circuit-switched (CS) and/or packet-switched Core (PS) networks. In some embodiments, the core network interface 1308 may include the S1 interface standardized by 3GPP. In some embodiments, the core network interface 1308 may include one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of the core network interface 1308 may include one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

The other interfaces 1310 may include transmitters, receivers, and other circuitry that enables the network node 1300 to communicate with external networks, computers, databases, and the like for purposes of operations, administration, and maintenance of the network node 1300 or other network equipment operably connected thereto.

Figure 14:
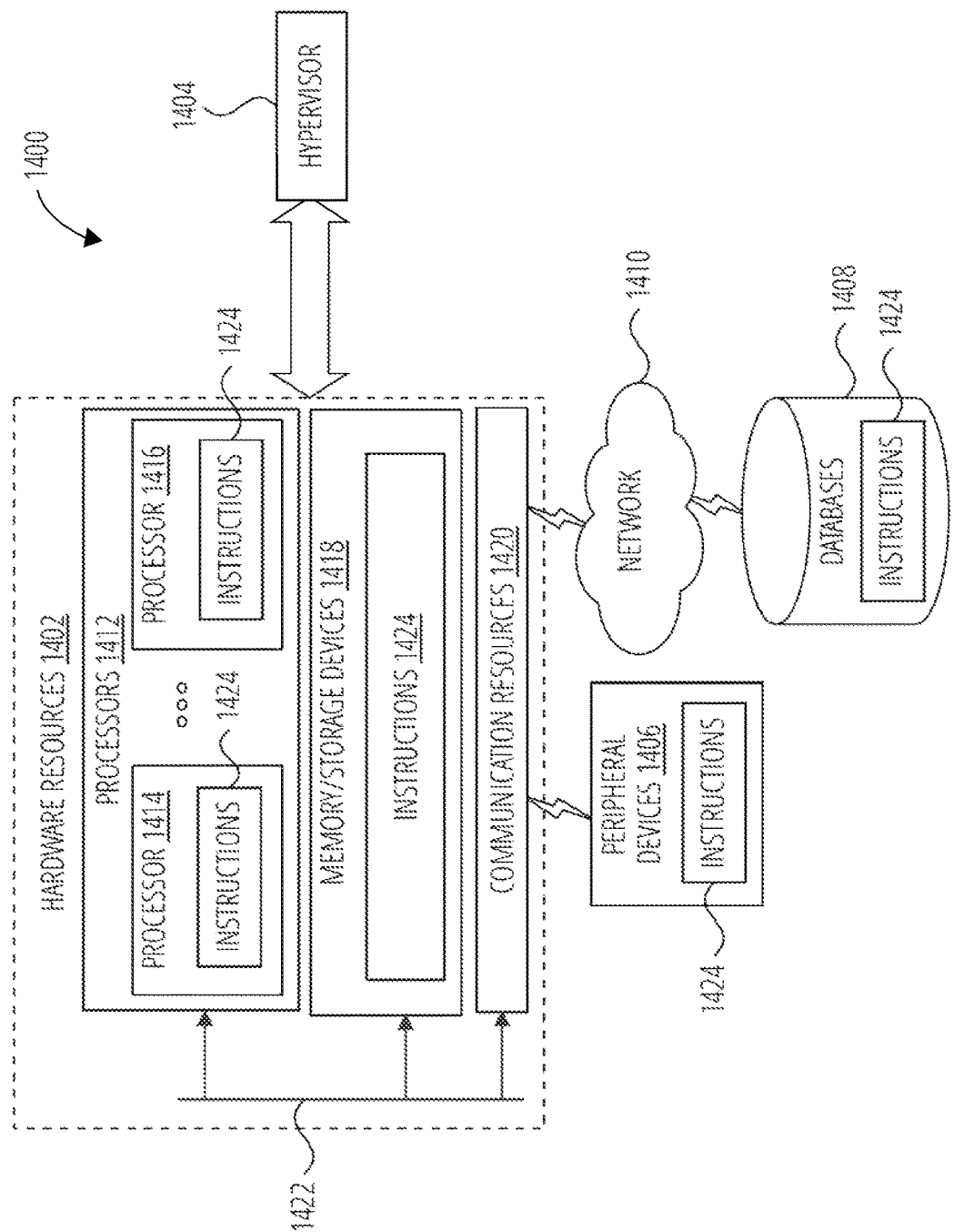
FIG. 14 illustrates components in accordance with one embodiment.

FIG. 14 is a block diagram illustrating components 1400, according to some example embodiments, able to read instructions from a machine-readable or computer-readable medium (e.g., a non-transitory machine-readable storage medium) and perform any one or more of the methodologies discussed herein. Specifically, FIG. 14 shows a diagrammatic representation of hardware resources 1402 including one or more processors 1412 (or processor cores), one or more memory/storage devices 1418, and one or more communication resources 1420, each of which may be communicatively coupled via a bus 1422. For embodiments where node virtualization (e.g., NFV) is utilized, a hypervisor 1404 may be executed to provide an execution environment for one or more network slices/sub-slices to utilize the hardware resources 1402.

The processors 1412 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1414 and a processor 1416.

The memory/storage devices 1418 may include main memory, disk storage, or any suitable combination thereof. The memory/storage devices 1418 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1420 may include interconnection or network interface components or other suitable devices to communicate with one or more peripheral devices 1406 or one or more databases 1408 via a network 1410. For example, the communication resources 1420 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1424 may comprise software, a program, an application, an applet, an app, or other executable code for causing at least any of the processors 1412 to perform any one or more of the methodologies discussed herein. The instructions 1424 may reside, completely or partially, within at least one of the processors 1412 (e.g., within the processor's cache memory), the memory/storage devices 1418, or any suitable combination thereof. Furthermore, any portion of the instructions 1424 may be transferred to the hardware resources 1402 from any combination of the peripheral devices 1406 or the databases 1408. Accordingly, the memory of the processors 1412, the memory/storage devices 1418, the peripheral devices 1406, and the databases 1408 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLE SECTION

The following examples pertain to further embodiments.

Example 1 is an apparatus for a user equipment (UE) to perform sounding reference signal (SRS) switching. The apparatus includes a transceiver and a processor (e.g., baseband processor). The processor is configured to transmit, through the transceiver to a base station, one or more SRS using a plurality of SRS resources of an SRS resource set configured for SRS switching according to a first combination of downlink (DL) and uplink (UL) antenna ports. For UE power saving, the processor is further configured to turn off one or more of the DL and UL antenna ports. The processor is further configured to reconfigure the plurality of SRS resources of the SRS resource set for SRS switching according to a second combination of the DL and UL antenna ports.

Example 2 includes the apparatus of Example 1, wherein to turn off one or more of the DL and UL antenna ports comprises to deactivate at least one DL antenna port of the first combination of DL and UL antenna ports, and wherein to reconfigure the plurality of SRS resources comprises to transmit the one or more SRS using a subset of the plurality of SRS resources based on the second combination of DL and UL antenna ports.

Example 3 includes the apparatus of Example 1, wherein to turn off one or more of the DL and UL antenna ports comprises to deactivate at least one DL antenna port of the first combination of DL and UL antenna ports, and wherein to reconfigure the plurality of SRS resources comprises to re-map a subset of the plurality of SRS resources to one or more active DL ports in the second combination of DL and UL antenna ports to provide repetition gain for the one or more SRS.

Example 4 includes the apparatus of Example 3, wherein the processor is further configured to, in response to a determination that a repeated SRS resource on the one or more active DL ports collides with another UL signal, drop all of the plurality of SRS resources of the SRS resource set.

Example 5 includes the apparatus of Example 3, wherein the processor is further configured to, in response to a determination that a repeated SRS resource on the one or more active DL ports collides with another UL signal, drop only the repeated SRS resource of the SRS resource set.

Example 6 includes the apparatus of Example 1, wherein to turn off one or more of the DL and UL antenna ports comprises to deactivate at least one DL antenna port of the first combination of DL and UL antenna ports, and wherein to reconfigure the plurality of SRS resources comprises to wait to transmit the one or more SRS using the plurality of SRS resources until an SRS configuration is received from a network device to configure the SRS resource set based on the second combination of the DL and UL antenna ports.

Example 7 includes the apparatus of Example 1, wherein to turn off one or more of the DL and UL antenna ports comprises to deactivate at least one UL antenna port of the first combination of DL and UL antenna ports, and wherein to reconfigure the plurality of SRS resources comprises to wait to transmit the one or more SRS using the plurality of SRS resources until an SRS configuration is received from a network device to configure the SRS resource set based on the second combination of the DL and UL antenna ports.

Example 8 includes the apparatus of Example 1, wherein to turn off one or more of the DL and UL antenna ports comprises to deactivate at least one UL antenna port of the first combination of DL and UL antenna ports, and wherein to reconfigure the plurality of SRS resources comprises to repeatedly transmit the SRS resource set at different transmission occasions according to the first combination of DL and UL antenna ports until a number of transmitted SRS resources is larger than a ratio of active DL antenna ports to active UL antenna ports.

Example 9 includes the apparatus of Example 1, wherein to turn off one or more of the DL and UL antenna ports comprises to deactivate at least one DL antenna port and at least one UL antenna port of the first combination of DL and UL antenna ports, and wherein to reconfigure the plurality of SRS resources comprises to wait to transmit the one or more SRS using the plurality of SRS resources, whether it is triggered or not, until an SRS configuration is received from a network device to configure the SRS resource set based on the second combination of the DL and UL antenna ports.

Example 10 includes the apparatus of Example 1, wherein to turning off one or more of the DL and UL antenna ports comprises to deactivate at least one DL antenna port and at least one UL antenna port of the first combination of DL and UL antenna ports so as to change from xTyR antenna switching to xTy'R antenna switching (x'<x, y'<y), where x represents a first number of transmit (T) chains and y represents a first number of receive (R) chains corresponding to the first combination of DL and UL antenna ports, where x' represents a second number of T chains and y' represents a second number of R chains corresponding to the second combination of DL and UL antenna ports, and wherein: if ceil(y'/x') is larger than ceil(y/x) such that more SRS resources are to be used, the UE transmits the SRS resource set configured with xTyR repeatedly until the number of SRS resources is larger than ceil(y'/x'); if ceil(y'/x') is smaller than ceil(y/x) such that some SRS resources are redundant, the UE does not transmit the SRS resources corresponding to y-y' ports for an SRS resource set antenna switch xTyR, or the UE transmits all the SRS resources for an SRS resource set antenna switching xTyR and the SRS resources corresponding to y-y' receive chains are re-mapped to other active DL ports to achieve repetition gain; or if ceil(y'/x') is the same as ceil(y/x), the UE changes port map and a transmitted port for each SRS resource and transmits the entire SRS resource set.

Example 11 includes the apparatus of Example 1, wherein to turn off one or more of the DL and UL antenna ports comprises to deactivate at least one DL antenna port and at least one UL antenna port of the first combination of DL and UL antenna ports so as to change from xTyR antenna switching to x'Ty'R antenna switching (x'<x, y'<y), where x represents a first number of transmit (T) chains and y represents a first number of receive (R) chains corresponding to the first combination of DL and UL antenna ports, where x' represents a second number of T chains and y' represents a second number of R chains corresponding to the second combination of DL and UL antenna ports, wherein ceil(y'/x')=C, wherein the UE uses antenna switching on SRS resource c for c∈0, . . . , C−2, with x' transmit chains used, wherein the x' transmit chains are mapped to downlink ports c·X', c·X'+1, . . . , c·X'+X'−1, and wherein the UE uses antenna switching on SRS resource c−1, with (y'−(C−1)x') transmit chains, which are mapped to downlink ports c·X', c·X'+1, . . . , y'−1, c=C−2.

Example 12 is a method for a user equipment UE) to perform sounding reference signal (SRS) switching. The method includes transmitting one or more SRS using a plurality of SRS resources of an SRS resource set configured for SRS switching according to a first combination of downlink (DL) and uplink (UL) antenna ports. The method further includes, for UE power saving, turning off one or more of the DL and UL antenna ports. The method further includes reconfiguring the plurality of SRS resources of the SRS resource set for SRS switching according to a second combination of the DL and UL antenna ports.

Example 13 includes the method of Example 12, wherein turning off one or more of the DL and UL antenna ports comprises deactivating at least one DL antenna port of the first combination of DL and UL antenna ports, and wherein reconfiguring the plurality of SRS resources comprises transmitting the one or more SRS using a subset of the plurality of SRS resources based on the second combination of DL and UL antenna ports.

Example 14 includes the method of Example 12, wherein turning off one or more of the DL and UL antenna ports comprises deactivating at least one DL antenna port of the first combination of DL and UL antenna ports, and wherein reconfiguring the plurality of SRS resources comprises re-mapping a subset of the plurality of SRS resources to one or more active DL ports in the second combination of DL and UL antenna ports to provide repetition gain for the one or more SRS.

Example 15 includes the method of Example 14, further comprising, in response to determining that a repeated SRS resource on the one or more active DL ports collides with another UL signal, dropping all of the plurality of SRS resources of the SRS resource set.

Example 16 includes the method of Example 14, further comprising, in response to determining that a repeated SRS resource on the one or more active DL ports collides with another UL signal, dropping only the repeated SRS resource of the SRS resource set.

Example 17 includes the method of Example 12, wherein turning off one or more of DL and UL antenna ports comprises deactivating at least one DL antenna port of the first combination of DL and UL antenna ports, and wherein reconfiguring the plurality of SRS resources comprises waiting to transmit the one or more SRS using the plurality of SRS resources until an SRS configuration is received from a network device to configure the SRS resource set based on the second combination of the DL and UL antenna ports.

Example 18 includes the method of Example 12, wherein turning off one or more of DL and UL antenna ports comprises deactivating at least one UL antenna port of the first combination of DL and UL antenna ports, and wherein reconfiguring the plurality of SRS resources comprises waiting to transmit the one or more SRS using the plurality of SRS resources until an SRS configuration is received from a network device to configure the SRS resource set based on the second combination of the DL and UL antenna ports.

Example 19 includes the method of Example 12, wherein turning off one or more of the DL and UL antenna ports comprises deactivating at least one UL antenna port of the first combination of DL and UL antenna ports, and wherein reconfiguring the plurality of SRS resources comprises repeatedly transmitting the SRS resource set at different transmission occasions according to the first combination of DL and UL antenna ports until a number of transmitted SRS resources is larger than a ratio of active DL antenna ports to active UL antenna ports.

Example 20 includes the method of Example 12, wherein turning off one or more of the DL and UL antenna ports comprises deactivating at least one DL antenna port and at least one UL antenna port of the first combination of DL and UL antenna ports, and wherein reconfiguring the plurality of SRS resources comprises waiting to transmit the one or more SRS using the plurality of SRS resources, whether it is triggered or not, until an SRS configuration is received from a network device to configure the SRS resource set based on the second combination of the DL and UL antenna ports.

Example 21 includes the method of Example 12, wherein turning off one or more of DL and UL antenna ports comprises deactivating at least one DL antenna port and at least one UL antenna port of the first combination of DL and UL antenna ports so as to change from xTyR antenna switching to xTy'R antenna switching (x'<x, y'<y), where x represents a first number of transmit (T) chains and y represents a first number of receive (R) chains corresponding to the first combination of DL and UL antenna ports, where x' represents a second number of T chains and y' represents a second number of R chains corresponding to the second combination of DL and UL antenna ports, and wherein: if ceil(y'/x') is larger than ceil(y/x) such that more SRS resources are to be used, the UE transmits the SRS resource set configured with xTyR repeatedly until the number of SRS resources is larger than ceil(y'/x'); if ceil(y'/x') is smaller than ceil(y/x) such that some SRS resources are redundant, the UE does not transmit the SRS resources corresponding to y-y' ports for an SRS resource set antenna switching xTyR, or the UE transmits all the SRS resources for an SRS resource set antenna switching xTyR and the SRS resources corresponding to y-y' receive chains are re-mapped to other active DL ports to achieve repetition gain; or if ceil(y'/x') is the same as ceil(y/x), the UE changes port mapping and a transmitted port for each SRS resource and transmits the entire SRS resource set.

Example 22 includes the method of Example 12, wherein turning off one or more of DL and UL antenna ports comprises deactivating at least one DL antenna port and at least one UL antenna port of the first combination of DL and UL antenna ports so as to change from xTyR antenna switching to x'Ty'R antenna switching (x'<x, y'<y), where x represents a first number of transmit (T) chains and y represents a first number of receive (R) chains corresponding to the first combination of DL and UL antenna ports, where x' represents a second number of T chains and y' represents a second number of R chains corresponding to the second combination of DL and UL antenna ports, wherein ceil(y'/x')=C, wherein the UE uses antenna switching on SRS resource c for c∈0, . . . , C−2, with x' transmit chains used, wherein the x' transmit chains are mapped to downlink ports c·X', c·X'+1, . . . , c·X'+X'−1, and wherein the UE uses antenna switching on SRS resource c−1, with (y'−(C−1)x') transmit chains, which are mapped to downlink ports c·X', c·X'+1, . . . , y'−1, c=C−2.

Example 23 is a method for a base station in a wireless network. The method includes receiving, at the base station from a user equipment (UE), a power saving message indicating a preference to reduce a number of multiple-input-multiple-output (MIMO) layers. The method further includes, in response to the power saving message, generating sounding reference signal (SRS) configuration information to configure an SRS resource set for SRS antenna switching based on a combination of active downlink (DL) antenna ports and active uplink (UL) antenna ports at the UE. The method further includes sending the SRS configuration information to the UE.

Example 24 includes the method of Example 23, further comprising: determining that a number of the active DL antenna ports is not an integer multiple of a number of the active UL antenna ports; and configuring different SRS resources with different antenna ports in the SRS resource set configured with SRS antenna switching.

Example 25 includes the method of Example 23, further comprising: determining that a number of the active DL antenna ports is not an integer multiple of a number of the active UL antenna ports; and configuring a same number of antenna ports for all SRS resources in the SRS resource set configured with SRS antenna switching.

Example 26 includes the method of Example 25, further comprising mapping a last SRS resource of the SRS resource set to previously used ports for repetition gain.

Example 27 may include an apparatus comprising means to perform one or more elements of a method described in or related to any of the above Examples, or any other method or process described herein.

Example 28 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 29 may include an apparatus comprising logic, modules, or circuitry to perform one or more elements of a method described in or related to any of the above Examples, or any other method or process described herein.

Example 30 may include a method, technique, or process as described in or related to any of the above Examples, or portions or parts thereof.

Example 31 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 32 may include a signal as described in or related to any of the above Examples, or portions or parts thereof.

Example 33 may include a datagram, packet, frame, segment, protocol data unit (PDU), or message as described in or related to any of the above Examples, or portions or parts thereof, or otherwise described in the present disclosure.

Example 34 may include a signal encoded with data as described in or related to any of the above Examples, or portions or parts thereof, or otherwise described in the present disclosure.

Example 35 may include a signal encoded with a datagram, packet, frame, segment, PDU, or message as described in or related to any of the above Examples, or portions or parts thereof, or otherwise described in the present disclosure.

Example 36 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 37 may include a computer program comprising instructions, wherein execution of the program by a processing element is to cause the processing element to carry out the method, techniques, or process as described in or related to any of the above Examples, or portions thereof.

Example 38 may include a signal in a wireless network as shown and described herein.

Example 39 may include a method of communicating in a wireless network as shown and described herein.

Example 40 may include a system for providing wireless communication as shown and described herein.

Example 41 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

What is claimed is:

1. An apparatus for a user equipment (UE) to perform sounding reference signal (SRS) switching, the apparatus comprising:
   a transceiver; and
   a processor configured to:
      transmit, through the transceiver to a base station, one or more SRS using a plurality of SRS resources of an SRS resource set configured for SRS switching according to a first combination of downlink (DL) and uplink (UL) antenna ports;
      for UE power saving, turn off one or more of the DL and UL antenna ports, wherein to turn off the one or more of the DL and UL antenna ports comprises to deactivate at least one DL antenna port of the first combination of DL and UL antenna ports; and
      reconfigure the plurality of SRS resources of the SRS resource set for SRS switching according to a second combination of the DL and UL antenna ports, wherein to reconfigure the plurality of SRS resources comprises to transmit the one or more SRS using a subset of the plurality of SRS resources based on the second combination of DL and UL antenna ports.

2. The apparatus of claim 1, wherein to reconfigure the plurality of SRS resources further comprises to re-map a subset of the plurality of SRS resources to one or more active DL ports in the second combination of DL and UL antenna ports to provide repetition gain for the one or more SRS.

3. The apparatus of claim 2, wherein the processor is further configured to, in response to a deteuuination that a repeated SRS resource on the one or more active DL ports collides with another UL signal, drop all of the plurality of SRS resources of the SRS resource set.

4. The apparatus of claim 2, wherein the processor is further configured to, in response to a detel ination that a repeated SRS resource on the one or more active DL ports collides with another UL signal, drop only the repeated SRS resource of the SRS resource set.

5. The apparatus of claim 1, wherein to reconfigure the plurality of SRS resources further comprises to wait to transmit the one or more SRS using the plurality of SRS resources until an SRS configuration is received from a network device to configure the SRS resource set based on the second combination of the DL and UL antenna ports.

6. The apparatus of claim 1, wherein to turn off one or more of the DL and UL antenna ports further comprises to deactivate at least one UL antenna port of the first combination of DL and UL antenna ports, and wherein to reconfigure the plurality of SRS resources comprises to wait to transmit the one or more SRS using the plurality of SRS resources until an SRS configuration is received from a network device to configure the SRS resource set based on the second combination of the DL and UL antenna ports.

7. The apparatus of claim 1, wherein to turn off one or more of the DL and UL antenna ports further comprises to deactivate at least one UL antenna port of the first combination of DL and UL antenna ports, and wherein to reconfigure the plurality of SRS resources comprises to repeatedly transmit the SRS resource set at different transmission occasions according to the first combination of DL and UL antenna ports until a number of transmitted SRS resources is larger than a ratio of active DL antenna ports to active UL antenna ports.

8. The apparatus of claim 1, wherein to turn off one or more of the DL and UL antenna ports further comprises to deactivate at least one DL antenna port and at least one UL antenna port of the first combination of DL and UL antenna ports, and wherein to reconfigure the plurality of SRS resources comprises to wait to transmit the one or more SRS using the plurality of SRS resources, whether it is triggered or not, until an SRS configuration is received from a network device to configure the SRS resource set based on the second combination of the DL and UL antenna ports.

9. The apparatus of claim 1, wherein to turn off one or more of the DL and UL antenna ports further comprises to deactivate at least one DL antenna port and at least one UL antenna port of the first combination of DL and UL antenna ports so as to change from xTyR antenna switching to x'Ty'R antenna switching (x'<x, y'<y), where x represents a first number of transmit (T) chains and y represents a first number of receive (R) chains corresponding to the first combination of DL and UL antenna ports, where x' represents a second number of T chains and y' represents a second number of R chains corresponding to the second combination of DL and UL antenna ports, and wherein:
- if ceil(y'/x') is larger than ceil(y/x) such that more SRS resources are to be used, the UE transmits the SRS resource set configured with xTyR repeatedly until the number of SRS resources is larger than ceil(y'/x');
- if ceil(y'/x') is smaller than ceil(y/x) such that some SRS resources are redundant, the UE does not transmit the SRS resources corresponding to y-y' ports for an SRS resource set antenna switch xTyR, or the UE transmits all the SRS resources for an SRS resource set antenna switching xTyR and the SRS resources corresponding to y-y' receive chains are re-mapped to other active DL ports to achieve repetition gain; or
- if ceil(y'/x') is the same as ceil(y/x), the UE changes port map and a transmitted port for each SRS resource and transmits the entire SRS resource set.

10. The apparatus of claim 1, wherein to turn off one or more of the DL and UL antenna ports further comprises to deactivate at least one DL antenna port and at least one UL antenna port of the first combination of DL and UL antenna ports so as to change from xTyR antenna switching to x'Ty'R antenna switching (x'<x, y'<y), where x represents a first number of transmit (T) chains and y represents a first number of receive (R) chains corresponding to the first combination of DL and UL antenna ports, where x' represents a second number of T chains and y' represents a second number of R chains corresponding to the second combination of DL and UL antenna ports, wherein ceil(y'/x')=C, wherein the UE uses antenna switching on SRS resource c for c∈0, . . . , C−2, with x' transmit chains used, wherein the x' transmit chains are mapped to downlink ports c·X', c·X'+1, . . . , c·X'+X'−1, and wherein the UE uses antenna switching on SRS resource c−1, with (y'−(C−1)x') transmit chains, which are mapped to downlink ports c·X', c·X'+1, . . . , y'−1, c=C−2.

11. A method for a user equipment (UE) to perfoim sounding reference signal (SRS) switching, the method comprising:
- transmitting one or more SRS using a plurality of SRS resources of an SRS resource set configured for SRS switching according to a first combination of downlink (DL) and uplink (UL) antenna ports;
- for UE power saving, turning off one or more of the DL and UL antenna ports, wherein turning off the one or more of the DL and UL antenna ports comprises deactivating at least one DL antenna port of the first combination of DL and UL antenna ports; and
- reconfiguring the plurality of SRS resources of the SRS resource set for SRS switching according to a second combination of the DL and UL antenna ports, wherein reconfiguring the plurality of SRS resources comprises transmitting the one or more SRS using a subset of the plurality of SRS resources based on the second combination of DL and UL antenna ports.

12. The method of claim 11, wherein reconfiguring the plurality of SRS resources further comprises re-mapping a subset of the plurality of SRS resources to one or more active DL ports in the second combination of DL and UL antenna ports to provide repetition gain for the one or more SRS.

13. The method of claim 12, further comprising, in response to deteiniining that a repeated SRS resource on the one or more active DL ports collides with another UL signal, dropping all of the plurality of SRS resources of the SRS resource set.

14. The method of claim 12, further comprising, in response to deteiniining that a repeated SRS resource on the one or more active DL ports collides with another UL signal, dropping only the repeated SRS resource of the SRS resource set.

15. The method of claim 11, wherein reconfiguring the plurality of SRS resources further comprises waiting to transmit the one or more SRS using the plurality of SRS resources until an SRS configuration is received from a network device to configure the SRS resource set based on the second combination of the DL and UL antenna ports.

16. The method of claim 11, wherein turning off one or more of the DL and UL antenna ports further comprises deactivating at least one UL antenna port of the first combination of DL and UL antenna ports, and wherein reconfiguring the plurality of SRS resources comprises waiting to transmit the one or more SRS using the plurality of SRS resources until an SRS configuration is received from a network device to configure the SRS resource set based on the second combination of the DL and UL antenna ports.

17. The method of claim 11, wherein turning off one or more of the DL and UL antenna ports further comprises deactivating at least one UL antenna port of the first combination of DL and UL antenna ports, and wherein reconfiguring the plurality of SRS resources comprises repeatedly transmitting the SRS resource set at different transmission occasions according to the first combination of DL and UL antenna ports until a number of transmitted SRS resources is larger than a ratio of active DL antenna ports to active UL antenna ports.

18. The method of claim 11, wherein turning off one or more of the DL and UL antenna ports further comprises deactivating at least one DL antenna port and at least one UL antenna port of the first combination of DL and UL antenna ports, and wherein reconfiguring the plurality of SRS resources comprises waiting to transmit the one or more SRS using the plurality of SRS resources, whether it is triggered or not, until an SRS configuration is received from a network device to configure the SRS resource set based on the second combination of the DL and UL antenna ports.

* * * * *